United States Patent [19]
Scofield

[11] Patent Number: 5,483,441
[45] Date of Patent: Jan. 9, 1996

[54] SYSTEM FOR ANIMAL EVALUATION THROUGH IMAGE ACQUISITION

[75] Inventor: Wayne W. Scofield, Piedmont, S. Dak.

[73] Assignee: Uniform Scanner Data Analysis, Inc., Rapid City, S. Dak.

[21] Appl. No.: 238,979

[22] Filed: May 6, 1994

Related U.S. Application Data

[63] Continuation of Ser. No. 753,428, Aug. 30, 1991.

[51] Int. Cl.$^6$ ........................................ G06T 3/20
[52] U.S. Cl. ........................................ 364/400
[58] Field of Search ................ 364/413.13; 358/93, 358/107, 106; 382/6; 395/100; 356/141.5, 141.4, 385, 390

[56] References Cited

U.S. PATENT DOCUMENTS

| | | | |
|---|---|---|---|
| 3,762,818 | 10/1973 | Johnson et al. | 356/120 |
| 3,877,818 | 4/1975 | Button et al. | 356/186 |
| 3,902,811 | 9/1975 | Altman et al. | 356/156 |
| 3,930,991 | 1/1976 | Gillespie | 209/3 |
| 4,089,608 | 5/1978 | Hoadley | 356/156 |
| 4,232,334 | 11/1980 | Dyson | 358/93 |
| 4,413,279 | 11/1983 | Görl | 358/107 |
| 4,745,472 | 5/1988 | Hayes | 356/107 |
| 4,783,833 | 11/1988 | Kawabata | 382/33 |
| 4,788,429 | 11/1988 | Wilson | 250/363 S |
| 4,939,574 | 7/1990 | Petersen et al. | 358/93 |
| 5,134,661 | 7/1992 | Reinsch | 382/1 |
| 5,140,988 | 8/1992 | Stouffer et al. | 128/660.01 |
| 5,208,747 | 3/1993 | Wilson et al. | 364/413.25 |

Primary Examiner—Gail O. Hayes
Assistant Examiner—Hayward A. Verdun
Attorney, Agent, or Firm—Kinney & Lange

[57] ABSTRACT

The present invention evaluates an animal to determine characteristics or traits thereof. The invention evaluates the animal as it moves through first and second scenes that correspond to different first and second fields of view.

31 Claims, 18 Drawing Sheets

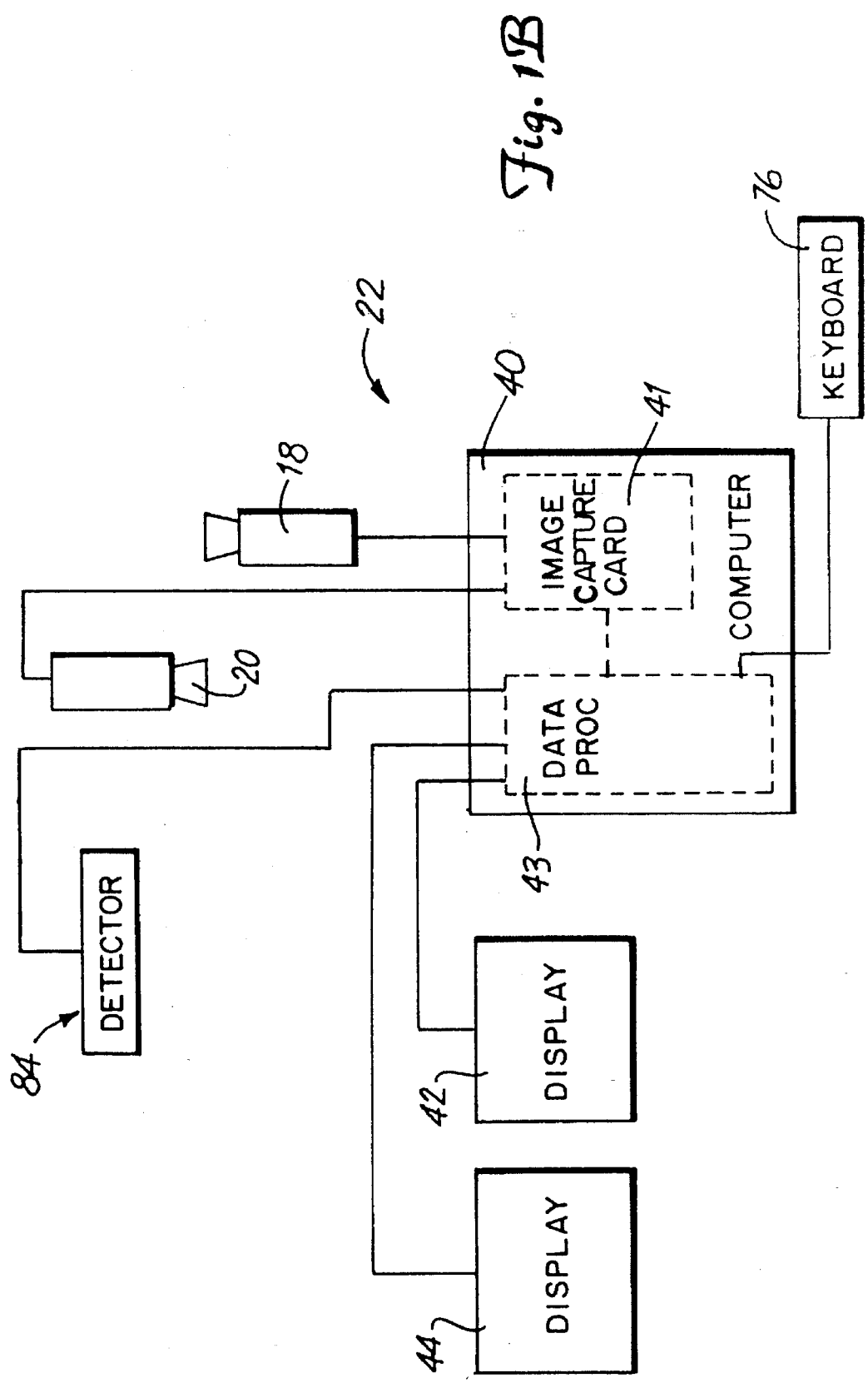

SYSTEM FOR ANIMAL EVALUATION THROUGH IMAGE ACQUISITION

This is a continuation of application Ser. No. 07/753,428, filed Aug. 30,1991.

BACKGROUND OF THE INVENTION

The present invention relates generally to a system for evaluating the economic potential of selected animals and, more particularly, to an animal evaluation system that permits an animal being evaluated to move during evaluation rather than being relatively immobilized.

For a number of years, those concerned with animal husbandry, such as farmers, ranchers and the like, have attempted to evaluate the physical characteristics of animals, such as beef cattle, in order to monitor growth and to select those animals with economically favorable traits. Such traits include, among others, the animal's ability to produce meat, milk and other products of a certain type and quality, the animal's ability to convert feed into viable carcass yield, i.e. production efficiency, and the animal's ability to reproduce.

The physical characteristics of a particular animal are generally known to be dependent upon, among other factors, the type and quantity of hormones found within the animal. Hormones are chemical messengers produced by endocrine glands providing secretions directly into the bloodstream which are transported to other parts of the body where they exert a direct effect on peripheral tissues or stimulate other organs or glands. These hormones regulate such important internal processes as growth, muscle development, age of maturity, levels of metabolism, fertility and pregnancy. For example, in beef cattle, the combination of growth hormones and male sex hormones (testosterone) provide for development and enlargement of the muscle systems in the "fore quarters" or "shoulder" area while the combination of growth hormones and female sex hormones (estrogen) provide for the development and enlargement in the muscle system in the "rear quarters" or more commonly referred to as the "stifle" area.

Thus, hormones affect much of an animal's general physical characteristics and so contribute significantly to the animal's economic value. Consequently, research has been conducted to determine, isolate and identify specific hormones appearing in, and the levels of such hormones within, an animal's bloodstreams at particular times and their corresponding bodily effects. This research, however, remains largely incomplete due in part to difficulties in isolating the concentrations and specific types of hormones in an animal's bloodstreams and, given the complex interdependent nature of hormones, difficulties in correlating such presence and quantities with corresponding effects upon present body composition or upon future body composition or both with respect to carcass yield and the animal's ability to reproduce.

Although quantitative correlations between hormone production and physical characteristics of an animal have been difficult to obtain, correlations do appear to exist between certain muscle and bone ratios and certain reproduction and carcass traits of that animal because all depend on the hormone production of the animal though in complex and differing ways. When combined with other physiological measurements such as height and length of the animal's body at given points, correlations between various animal body structures exist.

Physical evaluation of animals has heretofore commonly involved manually measuring specific physical dimensions of such animals and comparing these measurements to averaged values from other animals of a similar kind. In the past, this method involved restraining the animal in an appropriate stanchion, pen or cage so that a technician having a measuring device such as a measuring tape could measure various dimensions of the animal's body. This method, however, has been largely unsuccessful due in large part to unavoidable inconsistencies and inaccuracies in measurements taken by technicians because of the animal's shifting of position between measurements and because of the use of different techniques among technicians.

Recently, image recording systems have been used to obtain physical measurements. In a typical system of this kind, an animal is relatively immobilized by the confines of a chute, not much larger than the animal, in front of a first video camera for recording one side of the animal, and below a second video camera for recording the top side of the animal. Specific skeletal reference points, such as the hook corner of the pelvic bone, the thurl joint which is where the femur bone and the pelvic bone connect, the outermost portion of the stifle and the point of the shoulder are then located by a technician and identified on the animal with reference markers placed on the animal at those locations. The front camera is then activated to record the side profile of the animal and, once this side profile has been recorded, the top camera is activated to record the top profile. A computer then analyzes the video images to provide linear and angular measurements between the reference points for comparison with other animals of similar kind.

Although arguably more accurate than measurements taken by hand, such an image recording measurement system is of insufficient accuracy in providing measurement data on which accurate predictions of animal body compositions can be made. Specifically, in such an image recording system, the measurements remain substantially dependent upon the measuring technician's performance upon the consistent and accurate placement of reference markers upon the animal. This system also does not favorably accommodate for animal posture shifts. In a further shortcoming, the required relative immobilization of the animal during the imaging process prevents rapid sequential measurements of animals in any particular group being measured.

SUMMARY OF THE INVENTION

The present invention evaluates an animal to determine characteristics or traits thereof. The invention evaluates the animal as it moves through first and second scenes that correspond to different first and second fields of view. The invention acquires a first scene evaluation image representation of an image of the first scene at a selected time and a second scene evaluation image representation of an image of the second scene at substantially the same selected time. Each scene evaluation image representation includes portions that correspond to an animal image portion and a remainder image portion which is defined by excluding the respective animal image portion.

After acquiring the first and second scene evaluation image representations, the invention constructs corresponding first and second evaluation image segregation representations. The first and second evaluation image segregation representations segregate portions that correspond to at least a part of the first and second scene image animal image portions from portions that correspond to the first and second scene image remainder image portions. With the first and second image segregation representations defined, a plurality of selected parameters are ascertained. The plurality of selected parameters form selected animal indicia that are used to evaluate the animal.

BRIEF DESCRIPTION OF THE DRAWINGS

FIG. 1B illustrates in block diagram form the animal evaluation system of the present invention shown in FIG. 1A;

FIGS. 4A through 4K, 5A and 5B together illustrate the evaluation of a subject animal using the animal evaluation system of the present invention.

DETAILED DESCRIPTION OF THE PREFERRED EMBODIMENTS

Figure 1A:
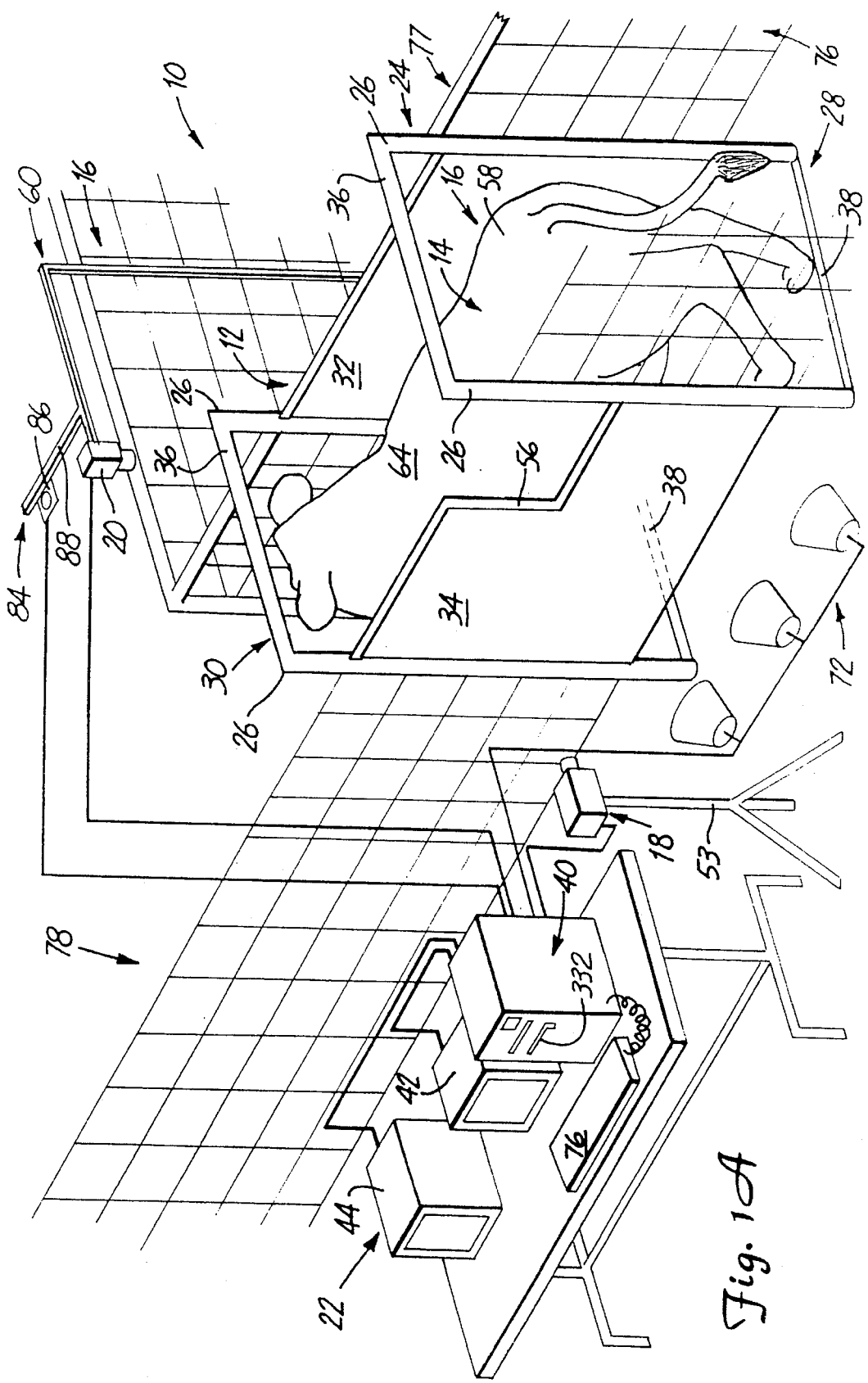
FIG. 1A illustrates pictorially the animal evaluation system of the present invention.

The animal evaluation system of the present invention is illustrated in FIG. 1A generally as, 10. The animal evaluation system 10 includes a chute, 12, with a relatively narrow passageway, 16, for continuing the path of an animal to be evaluated, 14, such as a cow or a steer, to pass within the field of view of an image recording apparatus. The image recording apparatus includes two video cameras, 18, and, 20, placed adjacent chute 12 and pointed to capture light from two different scenes therein along two corresponding lines of sight essentially perpendicular to one another, a side view scene and a top view scene. Cameras 18 and 20 are operated to acquire, at a selected moment, contemporaneous or substantially simultaneous profile scene image representations of portions of animal 14 along these two essentially perpendicular lines of sight to provide corresponding video data to a processing and analysis station, generally designated, 22, as animal 14 walks through passageway 16 in chute 12. Processing and analysis station 22 receives the video data in each frame, or sampling period, for the two contemporaneously taken profile scene image representations, one image scene each from image video cameras 18 and 20, and determines accurately therefrom selected physical outline measurements or parameters of animal 14 that are used to form selected animal indicia that in turn are used to establish and predict, specific characteristics of animal 14.

Chute 12 comprises a rectangular support frame, 24, having four vertical support columns, 26. A rear side wall, 32, and a front side wall, 34, are attached to the vertical support columns 26 to define an entrance location, 28, and an exit location, 30. Lateral frame support members, 36, and, 38, located at the upper and lower ends, respectively, of vertical support columns 26 at both the entrance location 28 and the exit location 30, provide lateral support to chute 12 and separate rear side wall 32 from front side wall 34 by an appropriate distance such that the longitudinal extent of animal 14 is orientated generally parallel with the longitudinal extent of passageway 16 when therein. Cameras 18 and 20 are placed adjacent chute 12 such that portions of animal 14 are within the field of view of cameras 18 and 20 simultaneously.

Cameras 18 and 20 are video cameras of conventional design each having, as its image acquisition element, a charge coupled device. Such charge coupled devices, herein also referred to individually as a "CCD", comprise a plurality of light sensitive sensors arrayed in a matrix or grid pattern. The average intensity of light impinging upon each light sensitive sensor over a sampling period is converted to a representative analog electric signal, a succession of which forms the video data to be provided to processing and analysis station 22.

Referring also to FIG. 1B, processing and analysis station 22 includes a computer means, 40, having an image video data receiving and storage system, such as a frame grabber or image capture card, 41, of conventional design that receives the analog video data signals for a sampling period and converts these analog electric signals to corresponding digital binary data upon an appropriate command from a control unit and data processing means, 43. The digital video data representing the contemporaneous scene images acquired from cameras 18 and 20 are stored in random access memory (RAM) located on the image capture card 41 with the binary value of each byte (8 bits) in RAM representing the average intensity of light that impinged upon the corresponding light sensitive sensor of the CCD during the selected sampling period. The range of possible stored intensity values, $2^8=256$, are known as "gray levels" wherein the absence of light has a decimal value of 0 (black) and the greatest amount of light has a decimal value of 255 (white). Data processing means 43 working with the scene image representation video data of the stored scene images on 10 the image capture card 41 segregates portions thereof corresponding to at least part of the first and second scene image animal image portions from portions thereof corresponding to portions not including the animal image portions. From these segregated scene image representations, data processing means 43 ascertains values of a plurality of selected parameters that in turn are used to form selected animal indicia. The selected animal indicia are used to estimate a value for a selected animal trait or characteristic. A conventional keyboard, 76, is connected to computer means 40 to provide for operator control.

Figure 2A:
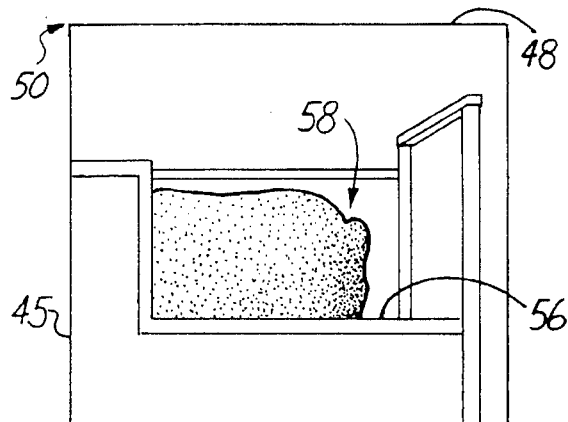
FIGS. 2A through 2E illustrate various reconstructed scene image portions acquired by, and in some instances manipulated with, the animal evaluation system of the present invention in a first scene setting.

The stored scene image representations are used as the display basis for a pair of video monitors or displays, 42 and 44, to reconstruct the corresponding scene images thereon. The reconstructed scene images approximate the original scene images, which correspond to the original scenes, through a grid or matrix pattern of picture elements, commonly referred to as "pixels" and arranged in columns and rows in correspondence with the light sensitive elements on the corresponding CCD. Reconstructed scene images are illustrated in FIGS. 2A through 2E and 3A through 3I. Referring to FIG. 2A, by way of example, each pixel is referenced as a coordinate pair (X,Y) with the first number, X, representing the number of pixels in a row, or succession of pixel columns, from a left border edge, 45, while the second number, Y, in each coordinate pair represents the number of pixels in a column, or succession of pixel rows, from an upper border edge, 48. An upper left corner, 50 of this pixel matrix has coordinates (0,0) and a lower right corner, 52, has coordinates $(X_{MAX}, Y_{MAX})$ wherein $X_{MAX}$ equals the total number of columns in the reconstructed scene image display and $Y_{MAX}$ equals the total number of rows in the reconstructed scene image display.

Referring back to FIG. 1A, camera 18 is placed on a suitable support means, such as a tripod device, 53, having its longitudinal axis aligned perpendicularly to an opening, 56, provided in front side wall 34. Thus, camera 18 is able to acquire a scene image representation of at least that portion of a side profile of animal 14 appearing to it in opening 56. The scene image acquired by camera 18 during a sampling period in which animal 14 is properly positioned in passageway 16 comprises the upper rear portion of the animal's hind quarter, 58, the image of which is projected on the lens of camera 18 through opening 56 as illustrated in the reconstructed scene image of FIG. 2A. Camera 20 is located above passageway 16 on a support member, 60, either secured to the rear side wall 32 or on a free standing tripod device similar to that of tripod 53. The axis of camera 20 is aligned perpendicular to the floor of chute 12 and over the centerline of passageway 16. Camera 20 acquires a scene image of at least a portion of the back, 64, of animal 14 as illustrated in the reconstructed image of FIG. 3A. Back or top profile portion 64 extends from a point, 66, forward of the animal's shoulders, 68, rearward to include the animal's rearmost point, 70. Suitable lighting means such as portable lights, 72, illustrated pictorially in FIG. 1A, together with lightening means, 74, which is shown schematically in FIGS. 3A through 3I with lighting means 72 as ovals indicating areas of higher light intensity illuminate animal 14 and chute 12 along opposite sides of passageway 16.

All components of evaluation system 10 are portable allowing the evaluation system to be set up in any convenient location. As illustrated in FIG. 1A, chute 12 is typically positioned in a gateway, 77, between two animal collection pens, 76 and 78. Pens 76 and 78 may reside indoors, such as in a barn, or outdoors, such as in a field or stockyard. Electrical power is supplied to evaluation system 10 from either conventional 110 volt line current or alternatively from a generator, not shown.

Figure 3A:
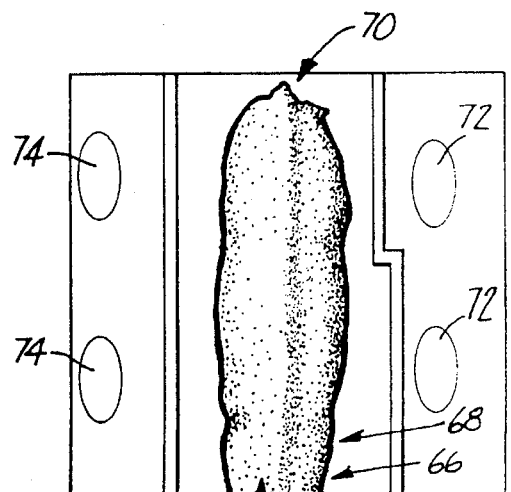
FIGS. 3A through 3I illustrate various reconstructed scene image portions acquired by, and in some instances manipulated with, the animal evaluation system of the present invention in a second scene setting.

Detection of animal 14 within passageway 16 is provided by an animal position detection means, 84. In the preferred embodiment, animal position detection means 84 includes an ultrasonic transducer, 86, attached to a support member, 88, that in turn is secured perpendicularly to support member 60 to parallel passageway 16. Ultrasonic transducer 86 is positioned above passageway 16 such that when the desired portions of the body of animal 14 are simultaneously within the field of views of camera 18 and camera 20, an output signal is provided therefrom to data processing means 43, illustrated in FIG. 1B. That signal, in turn, initiates image capture card 41 to direct the contemporaneous capture and storage of the video data provided by video cameras 18 and 20 in the current sampling periods of each scene corresponding to the two profile scene images falling on the lens of those cameras. As illustrated in the preferred embodiment of FIG. 1A, ultrasonic transducer 86 is positioned near exit location 30 such that when the head of animal 14 is detected, the animal's rear quarter 58 is located adjacent opening 56 and in front of camera 18 as illustrated in the reconstructed scene image of FIG. 2A, while main body 64 of animal 14, as illustrated in the reconstructed scene image of FIG. 3A, is located opposite camera 20. Storing the video data from the two contemporaneous or substantially simultaneous scene image representations taken of the scenes along the two different lines of sights, permits accurate physical measurements of animal 14 while that animal moves through chute 12 from pen 76 to pen 78 without the need for immobilizing animal 14 within chute 12.

Thus, various height and width measurements of animal 14 can be obtained from the contemporaneous scene image representations made as that animal moves through chute 12 or changes position therewithin. In the ensuing positional or configurational changes or both, individual muscles of muscle groups are either extended or contracted in a corresponding sequence necessary to accomplish such movement. The flexion and extension of these individual muscles causes corresponding interdependent changes in longitudinal and lateral profile dimensions thereof, and so in any measurements contemporaneously taken of that muscle group. However, the relationships between these muscle groups and other musculoskeletal parameters, such as hip height and selected body length, remain substantially unchanged despite the changes occurring in both the muscle group profile dimensions and the musculoskeletal parameters during such motions and reconfigurations. Thus, acquiring selected animal body parameters, using perpendicular scene image representations of the animal made contemporaneously, provides a basis for an accurate estimate of the animal's muscle configurations, and other related body structures, whatever the animal's configuration may have been at the time of such acquisition. Because of the interdependence of animal profile dimensions during motions or reconfigurations, this basis would be lost if the scene image representations were taken sufficiently separated in time from one another.

Although the present invention acquires selected parameters of the animal contemporaneously such that the basis is not lost or eliminated due to position changes of the animal, animal passage through chute 12 should not be greater than that of a walk. This is so because as the animal walks the weight of the animal is distributed on three of its legs in a succession of any one of four combinations. When the animal increases its rate to that of a canter, the weight of the animal alternates between distribution upon two legs to distribution on three legs which may result in less accurate measurement data.

Figure 4A:
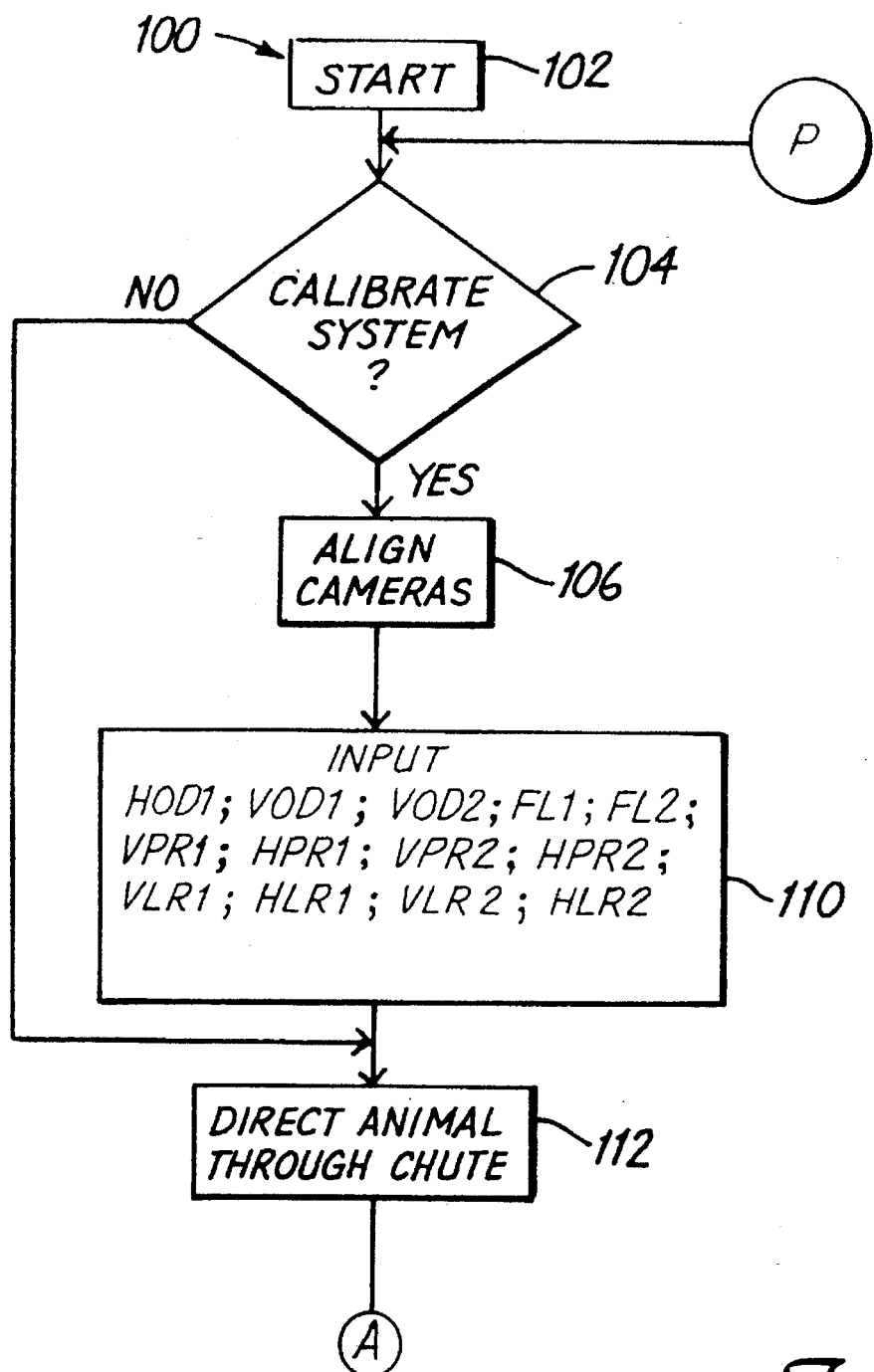

Operation of evaluation system 10 of FIG. 1A follows the steps shown in a procedure, 100, of FIGS. 4A through 4K, 5A and 5B. Referring to FIG. 4A, a block, 102, labeled "START" indicates the beginning of procedure 100 and represents activation of evaluation system 10 by an operator wherein appropriate power is supplied to cameras 18 and 20, lights 72 and 74 (if required), ultrasonic transducer 86 and processing and analysis station 22.

Next, as represented by a decision diamond, 104, if system operation first requires alignment of cameras 18 and 20 with chute 12 to obtain the selected scene images or initialization of system parameters to be described below, computer means 40 generates an appropriate message on, for example, monitor 42 to instruct the operator to align the cameras. Procedural flow then continues to blocks 106 and 110.

Block 106 represents the step of aligning the cameras. Camera 18 is aligned having its axis essentially perpendicular to opening 56 to provide a reconstructed scene image on monitor 42 that corresponds to the scene image falling on the lens of camera 18 that substantially encompasses opening 56 of chute 12 as illustrated in the reconstructed image of FIG. 2B. A horizontal line, 101, is then superimposed upon this reconstructed image and camera 18 is further adjusted such that horizontal line 101 is positioned substantially parallel to a predetermined image representation of a horizontal edge, 103, of chute 12.

Camera 20 is aligned in a similar manner. Camera 20 is aligned having its axis essentially perpendicular to the open top through of chute 12 to provide a reconstructed scene image on monitor 44 that corresponds to the scene image falling on the lens of camera 20 that encompasses that portion of chute 12 as illustrated in the reconstructed image of FIG. 3B. A vertical line, 104, is then superimposed upon this reconstructed image and camera 20 is further adjusted such that vertical line 104 is positioned substantially parallel to a predetermined image representation of an edge, 107, of chute 12.

When both cameras 18 and 20 have been properly aligned, corresponding offset distances are entered or stored in data processing means 43 as represented by a block, 110. These offset distances include the horizontal offset distance in inches between the lens of camera 18 and the center longitudinal vertical plane of chute 12, represented herein as "HOD1"; the vertical offset distance in inches from a point in passageway 16 above the floor of chute 12 that corresponds to a pixel or group of pixels on the reconstructed scene image of FIG. 2A essentially on a vertical centerline, 99, thereof, represented herein as "VOD1"; and the vertical offset distance between the lens of camera 20 perpendicular to the centerline of chute 12 in inches, represented herein as "VOD2".

In addition to the aforementioned offset distances, additional system parameters are also entered or stored in data processing means 43. These system parameters include the focal length of camera 18 in millimeters, represented herein as "FL1"; the focal length of camera 20 in millimeters, represented herein as "FL2"; the ratio of a succession of vertical pixels on monitor 42 to a corresponding succession of light sensitive elements arrayed in a portion of the CCD of camera 18, represented herein as "VPR1"; the ratio of a succession of horizontal pixels on monitor 42 to a corresponding succession of light sensitive elements arrayed in a portion of the CCD of camera 18, represented herein as "HPR1"; the ratio of a succession of vertical pixels on monitor 44 to a corresponding succession of light sensitive elements arrayed in a portion of the CCD of camera 20, represented herein as "VPR2"; the ratio of a succession of horizontal pixels on monitor 44 to a corresponding succession of light sensitive elements arrayed in a portion of the CCD of camera 20, represented herein as "HPR2"; the number of successive vertical light sensitive elements per millimeter for the CCD of camera 18, represented herein as "VLR1"; the number of successive horizontal light sensitive elements per millimeter for the CCD of camera 18, represented herein as "HLR1"; the number of successive vertical light sensitive elements per millimeter for the CCD of camera 20, represented herein as "VLR2"; and the number of successive horizontal light sensitive elements per millimeter for the CCD of camera 20, represented herein as "HLR2". The aforementioned offset distances and system parameters are used to translate selected animal height and width distances calculated from the video data corresponding to these reconstructed scene images to corresponding physical dimensions of the animal.

With the offset distances and system parameters stored in data processing means 43, the operator directs the first animal 14 through chute 12 as represented by a block, 112, in FIG. 4A.

Figure 4B:
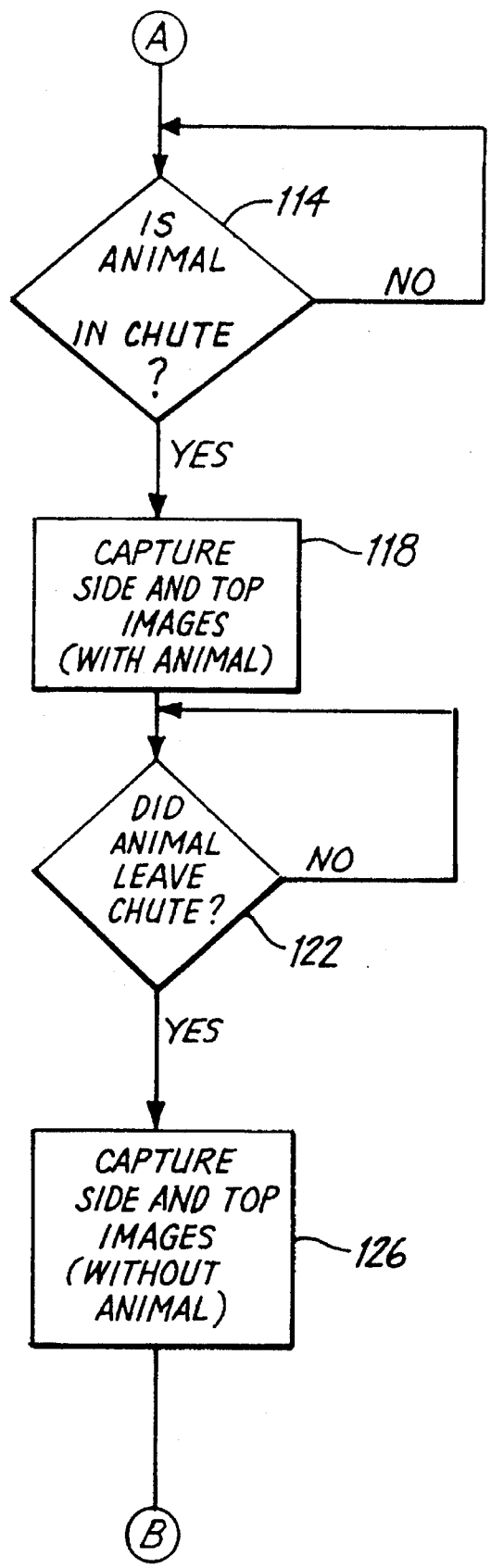
Figure 4C:
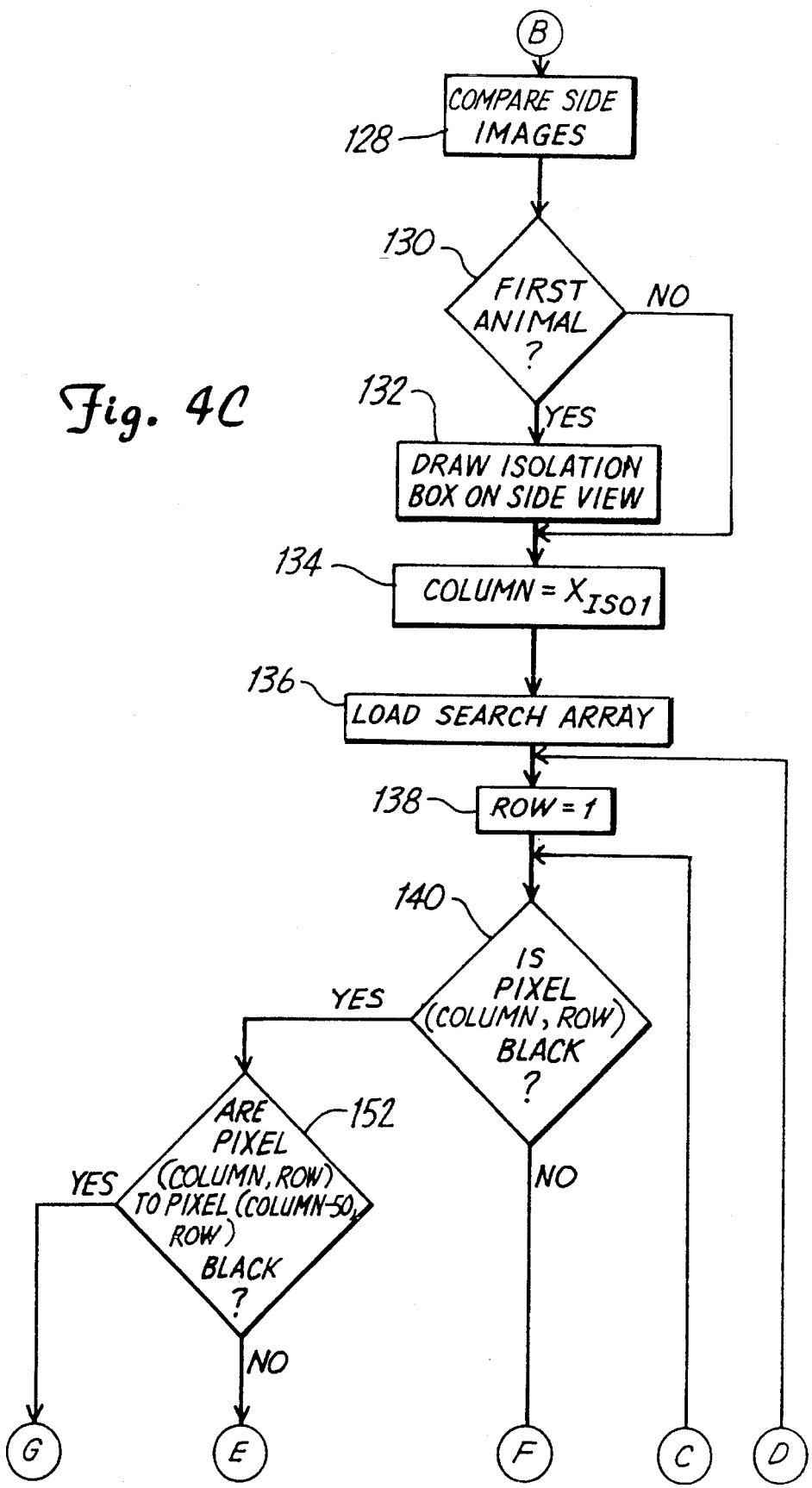

Next, referring to FIG. 4B, a decision diamond, 114, represents the step of detecting presence of animal 14 within the chute 12. As described above, ultrasonic transducer 86 detects the presence of animal 14 and provides an output signal that initiates image capture card 41 to direct the contemporaneous capture and storage of the video data provided by cameras 18 and 20 in the current sampling periods of each scene corresponding to the profile scene images falling on the lens of those cameras. A block, 118, represents the step of capturing the substantially simultaneous image representation profiles wherein the image capture card 41 of computer means 40 of FIG. 1, captures, during a selected sampling period, a side image representation corresponding to the scene falling upon the lens of camera 18 which is similar to that of the reconstructed image of FIG. 2A; and, approximately 1/60 of a second later or contemporaneously with that sampling period, after storage of the binary data corresponding to that side image representation in RAM, the image capture card then captures a top image representation corresponding to the scene falling upon the lens of camera 20 which is similar to that of the reconstructed image of FIG. 3A. The binary data corresponding to this top image representation is also stored in RAM.

A decision diamond, 122, then represents animal departure from chute 12 as monitored by the ultrasonic transducer 86. When the output signal from ultrasonic transducer 86 signifies that animal 14 has departed from chute 12, procedural flow continues to a block, 126. Block 126 represents the step of capturing the substantially simultaneous image representation profiles wherein the image capture card 41 of computer means 40 of FIG. 1, captures, during a selected sampling period, a second side image representation corresponding to the scene falling upon the lens of camera 18 which is similar to that of the reconstructed image of FIG. 2B, but without horizontal line 101; and, approximately 1/60 of a second later or contemporaneously with that sampling period, after storage of the binary data corresponding to that second side image representation in RAM, the image capture card then captures a second top image representation corresponding to the scene falling upon the lens of camera 20 which is similar to that of the reconstructed image of FIG. 3B, but without vertical line 105. The binary data corresponding to this second top image representation is also stored in RAM.

A block, 128, then represents the step of constructing from the first side image representation, a first side image segregation representation that segregates portions of the first side image representation into a portion that corresponds to at least a part of the image of the animal's hind quarter 56 as illustrated in the reconstructed image of FIG. 2A from portions that correspond to a side image remainder portion that does not include that image part of the animal's hind quarter 56. In the preferred embodiment, the step of constructing includes comparing the value (gray level) stored within each corresponding byte for each pixel of the first side image representation with the corresponding value stored within each corresponding byte for each corresponding pixel of the second side image representation. Under this processing operation, if the gray levels of a given pixel are substantially the same, as determined by a resultant value within a predetermined range of possible values, the corresponding pixel of the first side image representation is determined to be part of the remainder portion and assigned a gray level value corresponding to white in the side image segregation representation. If, however, the gray levels of a given pixel are substantially different, as determined by a resultant value exceeding the predetermined possible range of values, the corresponding pixel is considered part of the animal portion and assigned a gray level value corresponding to black in the side image segregation representation.

Alternative image processing techniques to segregate portions of the first side image representation into the corresponding animal image portion from the remainder image portion are herein included. For example using only the first side image representation, the gray level value stored within each corresponding byte for each pixel of the first side image representation can be compared to a preselected threshold value. Under this processing operation, if the gray level value of that corresponding pixel is greater than or equal to the threshold value, the corresponding pixel of the first side image representation is determined to be part of the remainder portion and assigned a gray level value corresponding to white in the side image segregation representation. If, however, the gray level value of that corresponding pixel is less than the threshold value, the corresponding pixel is considered part of the animal portion and assigned a gray level value corresponding to black in the side image segregation representation.

Figure 2B:
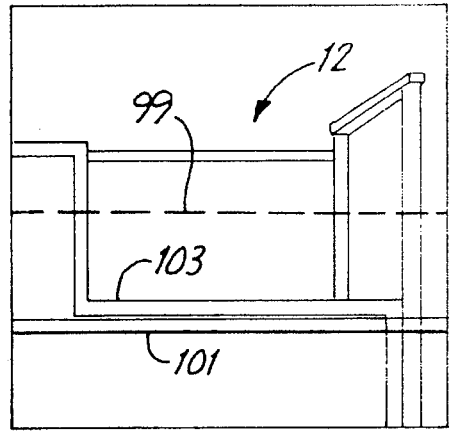
Figure 2C:
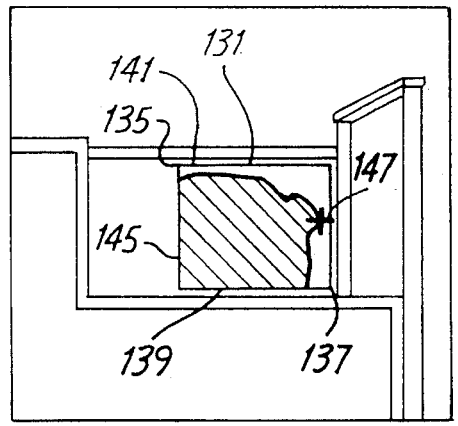

Next, as represented by a decision diamond, 130, if this is the first animal for a successive run of animals through the evaluation system, the operator at the processing and analysis station 22 then superimposes, as represented by a block, 132, an isolation box, 131, illustrated in the reconstructed image of FIG. 2C, to isolate the rear top portion 58 of animal 14. Utilization of isolation box 131 increases the efficiency of system 10 by reducing the computational operations necessary to obtain physical measurements of animal 14 in that all further processing upon the segregated side image representation is confined within isolation box 131. Isolation box 131 is also used by processing and analysis station 22 in successive runs of animals through the chute 12 thereby eliminating further operator interaction with successive segregated side image representations. As such, isolation box 131 is made sufficiently large to encompass minor variations between animals of successive runs.

Figure 2D:
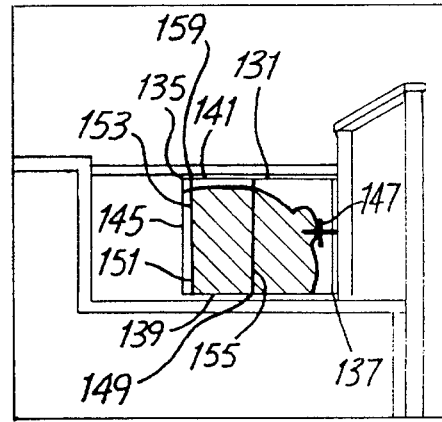
Figure 2E:
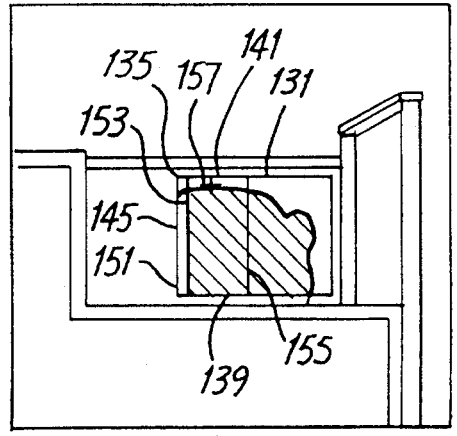

FIGS. 2C through 2E illustrate a portion of the resultant binary, black, (illustrated with hatching), or white, segregated image representation contained within isolation box 131 superimposed upon the background or second image representation of FIG. 2B but excluding the horizontal line 101. These FIGS. are provided as illustrative aids in describing the location of selected points and calculation therefrom of selected parameters from the segregated representation data that corresponds to the animal image portion. Reconstruction of these images after defining isolation box 131 is not necessary given that selected parameters are based on the corresponding stored segregated representation data.

Referring to FIG. 2C, the segregated image representation portion of isolation box 131, herein also referred as "isolation box 131" has $X_{ISO1}$ columns and $Y_{ISO1}$ rows wherein an upper left corner, 135, has pixel coordinates (1, 1) and a lower right corner, 137, has pixel coordinates ($X_{ISO1}, Y_{ISO1}$). Isolation box 131 is used by data processing means 43 according to the steps described below to locate selected portions of the corresponding animal image portion to determine selected parameters.

Referring back to FIG. 4C and beginning with a block, 134, a counter labeled "column" is initialized with the corresponding value of the right most column, $X_{ISO1}$, of isolation box 131. A one dimensional search array is then loaded with the gray level values of each pixel contained within the column designated by the column counter as represented by a block, 136.

A counter labeled "row" is then initialized at a value of one as represented by a block, 138, and the corresponding element value indexed by the row counter in the search array which also corresponds to the pixel having as coordinates (column, row) is examined for a gray level equal to zero which denotes the occurrence of a black pixel. A decision diamond, 140, represents examination of the pixel and if this pixel is not black, the row counter value is incremented by one as represented by a block, 142, in FIG. 4D. Provided that the row counter value does not exceed $Y_{ISO1}$, the row corresponding to a lower edge, 139, of the isolation box 131 shown in FIG. 2C, as represented by a decision diamond, 144, procedural control is returned to block 140 with continued searching progression through the one dimensional array corresponding to the current column of pixels.

If, however, the row counter value does exceed the lower edge 139 of isolation box 131, as signified by the row counter value greater than $Y_{ISO1}$, the column counter value is then decremented by one as represented by a block, 146. If the column counter obtains a value less than one, indicating that the first column or a left border edge, 145, of isolation box 131 shown in FIG. 2C has been searched and that isolation box 131 has been completely examined without a determination of the "tail point", as represented by a decision diamond 148, the search procedure would then be halted at a block, 150, labeled "STOP", and an appropriate warning or indication would be initiated by processing and analysis station 22. In the event the column counter value is not less than one or beyond left border edge 145 of isolation box 131, control is returned to block 138 wherein the row counter is reinitiated to a value of one.

Downward and leftward pixel examination through isolation box 131 is continued according to the process described above until a black pixel, as represented by decision diamond 140, has been detected. To verify that this pixel corresponds to a point on the animal image portion, the gray level values of 50 pixels to the left of the detected black pixel are added together, as represented by a decision diamond, 152. If the sum of these values equals zero, indicating a continuous black image, a tail point, 147 of animal 14, illustrated in FIG. 2C, has been located and the corresponding values of the column and row counters are stored as the "tail point" coordinates, as represented by a block, 154, in FIG. 4D. If in the event that the sum of gray level values to the left of the detected black pixel does not equal zero, the search process continues searching for another black pixel by incrementing the row counter value by one as represented by block 142.

Figure 4D:
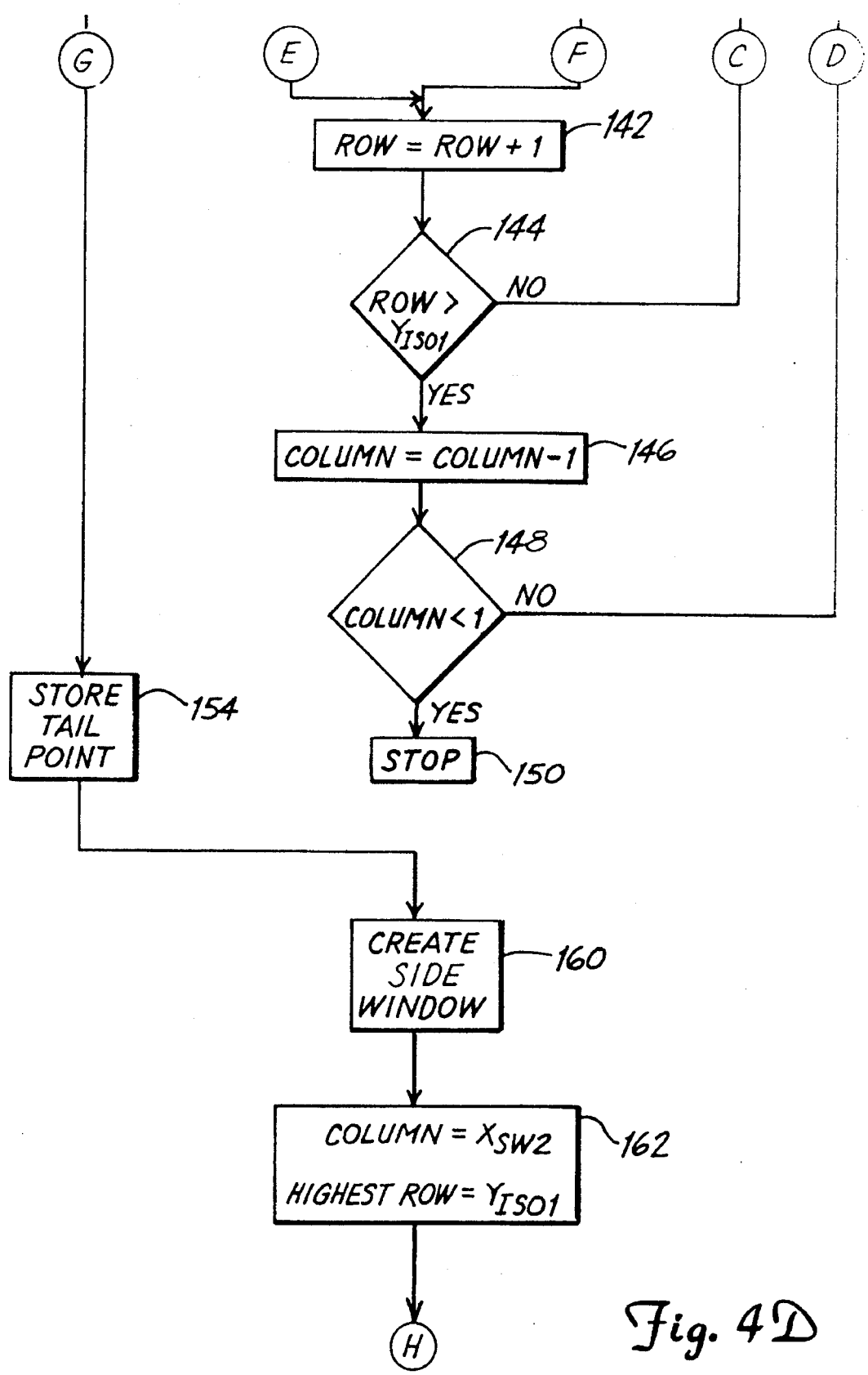

To calculate the animal's rump height, a side window, 151, shown in FIG. 2D, is defined from a portion of isolation box 131. A block, 160, in FIG. 4D represents the creation of the side window 151 from isolation box 131. The side window 151 comprises a pixel matrix having $Y_{ISO1}$ rows and $X_1$ columns wherein an upper left corner, 159, has coordinates ($X_{SW1}$, 1) and a lower right corner, 149, has coordinates ($X_{SW2}, Y_{ISO1}$) and wherein $X_1$ equals the number of successive columns or pixels between $X_{SW1}$, a left border edge, 153, and $X_{SW2}$, a right border edge, 155, to be determined below. Side window 151 has upper and lower border edges, 141, and 139 respectively, equal to that of isolation box 131.

Left border edge 153 and right border edge 155 extend forwardly on animal 14 from the rear tail point 147, 24 inches and 12 inches, respectively. The location and dimension of side window 151 have been determined from prior research which has indicated the location of the highest rear point of the animal relative to the tail point 147. Left border edge 153 and right border edge 155 each are determined from the following equation:

Equation 1:

$$A = (B * FL1/HOD1) * HLR1 * HPR1$$

where A represents the number of successive pixels on the segregated side image representation to be subtracted from the column coordinate of the stored tail point 147 to determine the corresponding value of $X_{SW1}$ and $X_{SW2}$; B represents the actual length in inches to be converted, i.e. 12 or 24 inches; and FL1, HLR1, HPR1 and HOD1 represent system parameters described above. The quantity (B*FL1/HOD1) represents the distance in millimeters on the CCD of camera 18 that is proportional to distance B while HLR1 and HRP1 are system parameters needed to convert that proportional distance to a succession of pixels.

Figure 4E:
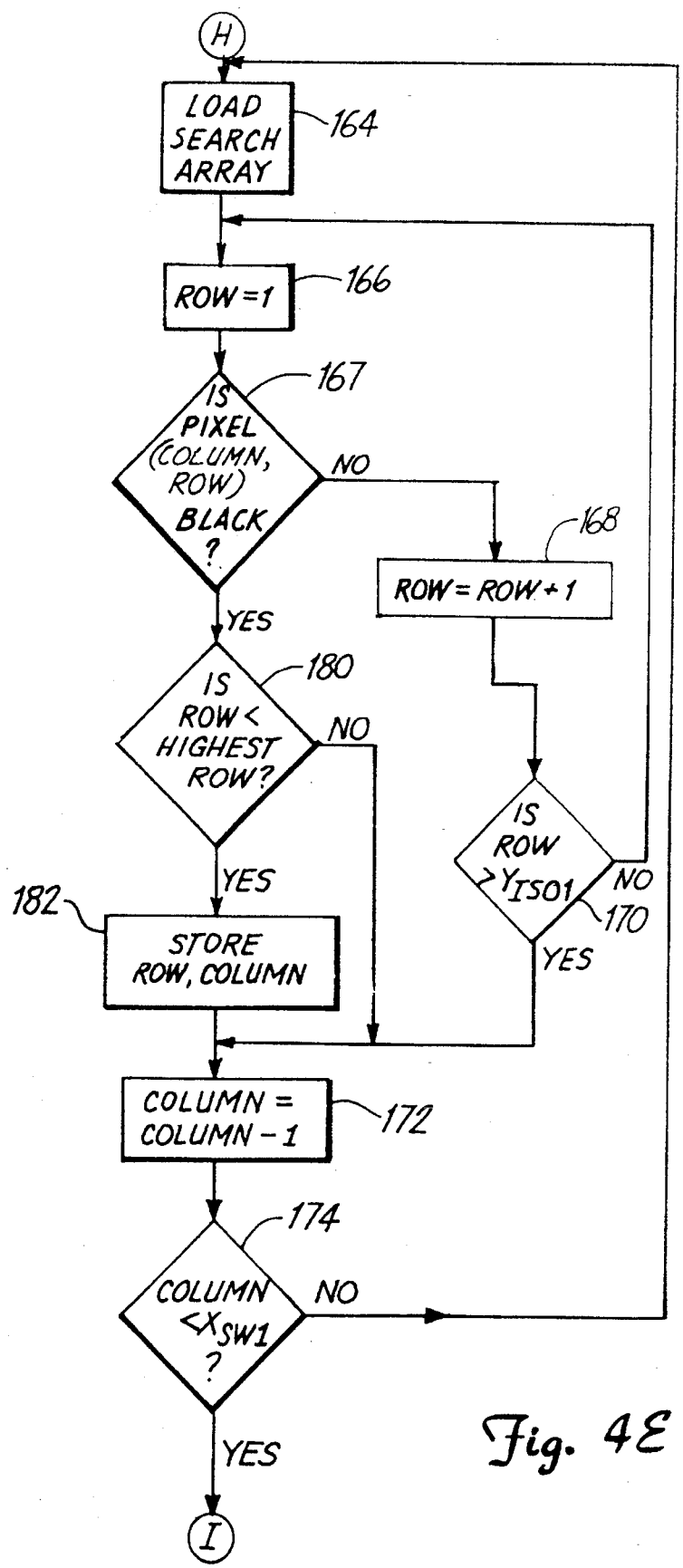

Next, referring to FIGS. 2D and 4D, a block, 162, represents initialization of a counter labeled "column" with the right most column $X_{SW2}$ of side window 151 and a variable labeled "highest row" at $Y_{ISO1}$, the lower border edge 139. Referring next to FIG. 4E, a one dimensional search array is then loaded with the gray level values of each pixel contained within the column designated by the column counter value, as represented by a block, 164.

A counter labeled "row" is then initialized at a value of one as represented by a block, 166, and the corresponding element value indexed by the row counter in the search array which also corresponds to the pixel having as coordinates (column, row) is examined for a gray level value equal to zero which denotes the occurrence of a black pixel. A decision diamond, 167, represents examination of the pixel and if this pixel is not black, the row counter value is incremented by one as represented by a block, 168. Provided that the row counter value does not exceed $Y_{ISO1}$, the row corresponding to the lower border edge 139, as represented by a decision diamond, 170, procedural control is returned to block 166 with continued searching progression through the search array corresponding to the current column of pixels.

If, however, the row counter value exceeds the lower border edge 139, as denoted by a row counter value greater than $Y_{ISO1}$, the column counter value is decremented by one as represented by a block, 172. If the column counter value does not obtain a value less than $X_{SW1}$, representing left border edge 153, as represented by a decision diamond, 174, procedural control is returned to block 164 where the search array is then loaded with the gray level values of the next column to be searched.

As described above, the step of detecting a black pixel within a given column is represented by decision diamond 167. Upon detection of a black pixel, the corresponding row coordinate for that pixel is compared with the value stored in the variable highest row. If the row counter value is less than the value stored in the highest row variable, signifying that the present black pixel is higher than any previous black pixel so far encountered, as represented by a decision diamond, 180, the coordinates (column, row) for the current pixel are stored in memory wherein the row counter value is also stored as the highest row variable, as represented by a block, 182. The column counter value is then again decremented by one in block 172 with its value compared to $X_{SW1}$, representing the left border edge 153, in decision diamond 174. When the column counter value is less than $X_{SW1}$, indicating that each column of window 151 has been searched, then the stored coordinates (column, row) correspond to the highest point, 157, on animal 14 shown in FIG. 2E and as represented by block, 184, in FIG. 4F.

The coordinates of the highest point 157, which corresponds to the rump height point, serve as input to a block, 186. Block 186 represents calculation of the "rump height" and "tail-rump height" distances of animal 14. The rump height distance, herein also referred as "RH", is the distance in inches of the rump height point 157 of the animal from the ground and is determined from the following equation:

Equation 2:

$$RH = VOD1 + C$$

where VOD1 represents the vertical offset distance described above which also corresponds to the center row 99 illustrated in FIG. 2B, and C represents the length in inches between VOD1 and the actual rump height of the animal; and where C is determined from the following equation:

Equation 3:

$$C = (D/VLR1/VPR1)*(HOD1/FL1)$$

where D represents the number of successive vertical pixels on the segregated side image representation between the center row of pixels and the row coordinate of the stored rump height point 157, D being positive if the row coordinate of the stored rump height point is above the center row 99 of pixels illustrated in FIG. 2B and negative if the row coordinate of the stored rump height point 157 is below the center row 99 of pixels. VPR1, VLR1, FL1 and HOD1 represent system parameters described above. The quantity (D/VLR1/VPR1) represents the distance in millimeters on the CCD of camera 18 that is proportional to the succession of pixels denoted by D while the quantity (HOD1/FL1) is used to convert that proportional distance to a corresponding distance in inches.

The tail-rump height distance, herein also referred as "TR", is the corresponding horizontal distance in inches between the column coordinate of the tail point 147 and the column coordinate of the rump height point 157 on the segregated side image representation and is determined from the following equation:

Equation 4:

$$TR = (E/HLR1/HPR1)*(HOD1/FL1)$$

where E represents the number of successive horizontal pixels on the segregated side image representation between the column coordinate of the tail point 147 and the column coordinate of the rump height point 157. HPR1, HLR1, FL1 and HOD1 represent system parameters described above. The quantity (E/HLR1/HPR1) represents the distance in millimeters on the CCD of camera 18 that is proportional to the succession of pixels denoted by E while the quantity (HOD1/FL1) is used to convert that proportional distance to a corresponding distance in inches.

Figure 4F:
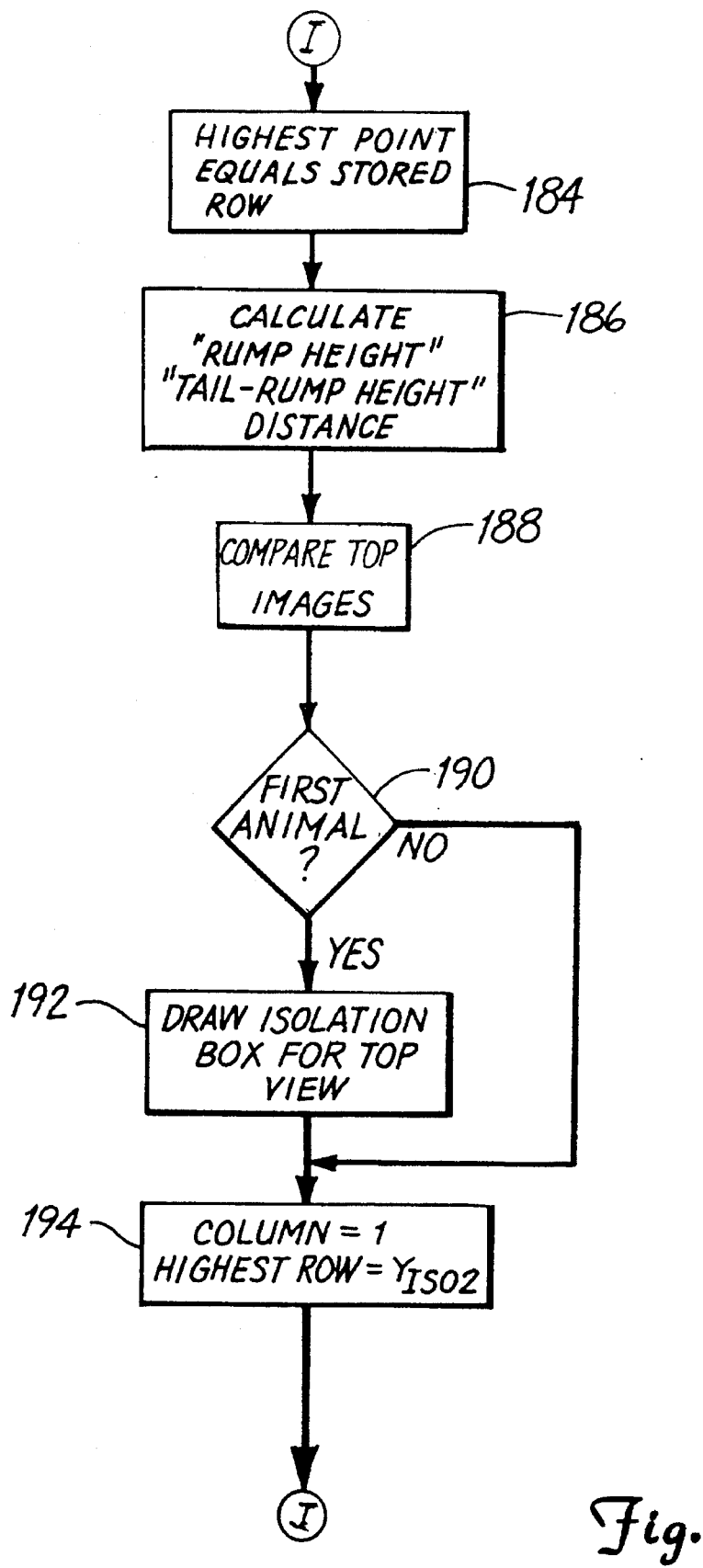

Physical measurements obtained from the top image representations are calculated from the procedure shown in FIG. 4F beginning with a block, 188. Block 188 represents the step of constructing from the first top image representation, a top image segregation representation that segregates portions of the first top image representation into a portion that corresponds to at least a part of the image of the animal's main body 64 illustrated in the reconstructed image of FIG. 3A from portions that correspond to a top image remainder portion that does not include that image part of the animal's main body 64. In the preferred embodiment, the step of constructing includes comparing the gray level value stored within each corresponding byte for each pixel of the first top image representation with the corresponding value stored within each corresponding byte for each corresponding pixel of the second top image representation. Under this processing operation, if the gray level values for a given pixel are substantially the same, as determined by a resultant value between a predetermined range of possible values, the corresponding pixel of the first top image representation is determined to be part of the remainder portion and assigned a gray level value corresponding to white in the top image segregation representation. If, however, the gray level values of a given pixel are substantially different, as determined by a resultant value exceeding the predetermined range of possible values, the corresponding pixel is considered to be part of animal portion 14 and assigned a gray level value corresponding to black in the top image segregation representation.

As stated above with reference to processing of the side image representations, alternative image processing techniques to segregate the top image animal portion from the remainder image portion are herein included.

Figure 3B:
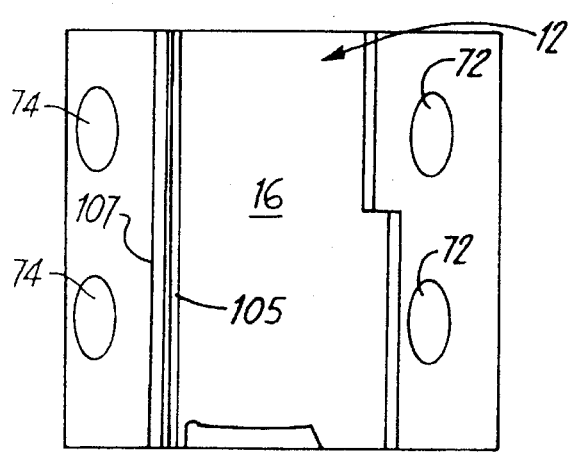
Figure 3C:
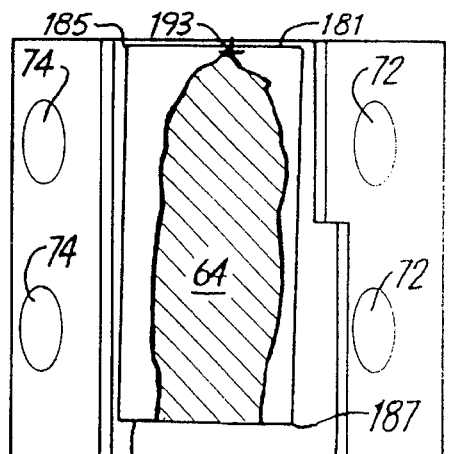

Next, as represented by a decision diamond, 190, if this is the first animal for a successive run of animals through the evaluation system, the operator at processing and analysis station 22 then superimposes, as represented by a block, 192, an isolation box 181, illustrated in reconstructed image of FIG. 3C, to isolate the top portion 64 of the animal. Like isolation box 131 of FIG. 2C, utilization of isolation box 181 increases the efficiency of system 10 by reducing the computational operations necessary to obtain physical measurements of animal 14 in that all further processing upon the segregated top image representations is confined within isolation box 181. Isolation box 181 is also used by the processing and analysis station 22 in successive runs of animals through the chute 12 thereby eliminating further operator interaction with successive top image representations. As such, isolation box 181 is made sufficiently large to encompass minor variations between animals of successive runs.

FIGS. 3C through 3I illustrate the resultant binary, black (illustrated with hatching) or white, segregated image representation contained within isolation box 181 superimposed upon the background or second top image representation of FIG. 3B but excluding the vertical line 105. These Figures are provided as illustrative aids in describing the location of selected points and calculation therefrom of selected parameters from the segregated representation data that corresponds to the animal image portion. Reconstruction of these images after defining isolation box 181 is not necessary given that selected parameters are based on the corresponding stored segregated representation data.

Referring to FIGS. 3C, the segregated image representation portion of isolation box 181, herein also referred as "isolation box 181", has $X_{ISO2}$ columns and $Y_{ISO2}$ rows wherein an upper left corner, 185, has pixel coordinates (1, 1) and a lower right corner, 187, has pixel coordinates ($X_{ISO2}$, $Y_{ISO2}$). Isolation box 181 is used by data processing means 43 according to the steps described below to locate selected portions of the corresponding animal image portion to determine selected parameters.

Figure 4G:
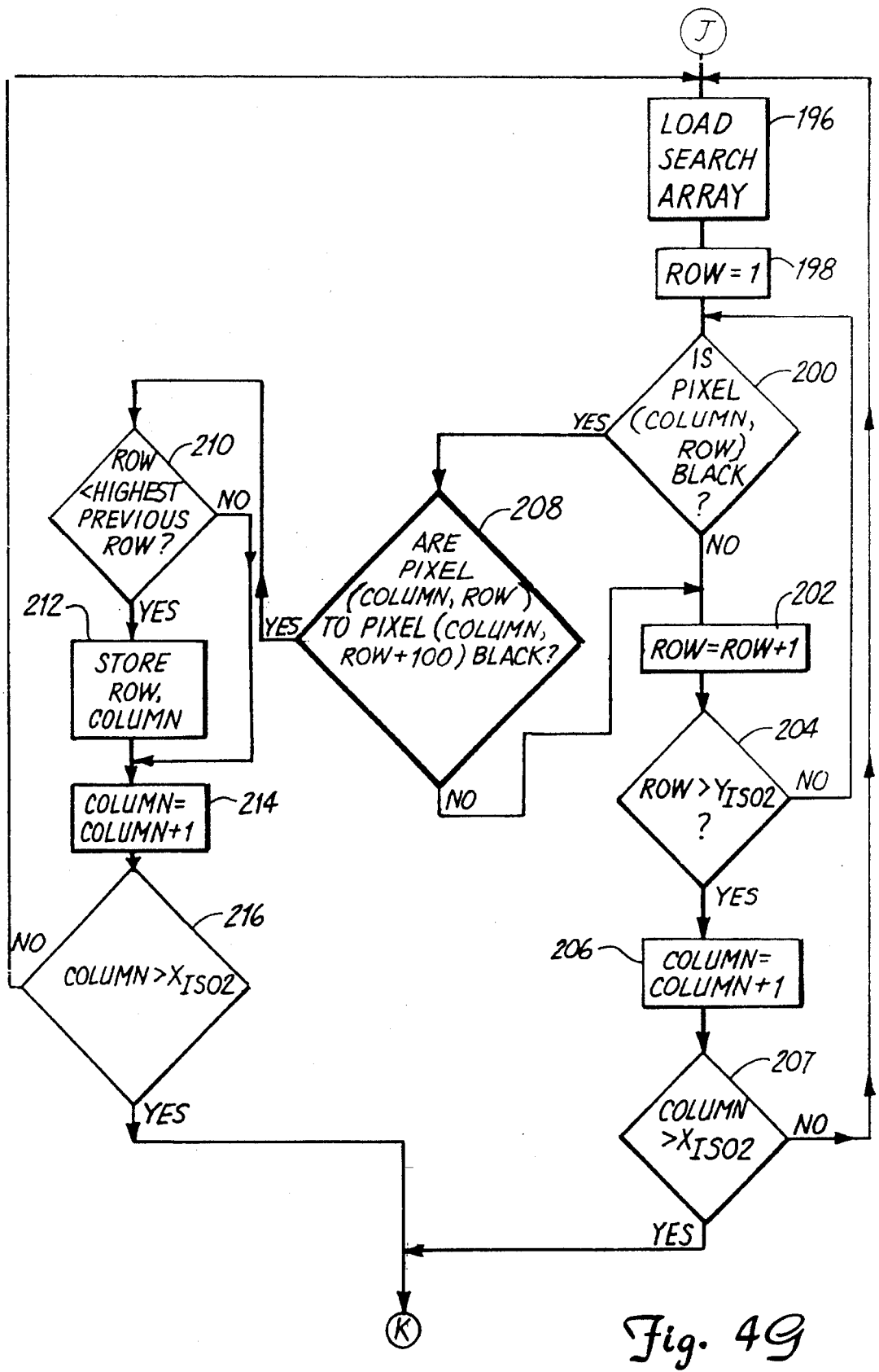

Referring back to FIG. 4F and beginning with a block, 194, a counter labeled "column" is initialized with a value of one and a variable "highest row" is initialized with a value of $Y_{ISO2}$, a row value corresponding to a lower border edge, 189, of isolation box 181. Referring to FIG. 4G, a one-dimensional search array is then loaded with the gray level values of each pixel contained within the column designated by the column counter value as represented by a block, 196.

A counter labeled "row" is then initialized at a value of one as represented by a block, 198, and the corresponding element value indexed by the row counter in the search array which also corresponds to the pixel having as coordinates (column, row) is examined for a gray level equal to zero which denotes the occurrence of a black pixel. A decision diamond, 200, represents examination of the pixel and if this pixel is not black, the row counter value is incremented by one as represented by a block, 202. Provided that the row counter value does not exceed $Y_{ISO2}$, the lower border edge 189, as represented by a decision diamond, 204, procedural control is returned to block 200 with continued searching through the one dimensional array that corresponds to the current column of pixels.

If, however, the row counter value exceeds the lower border edge 189 of isolation box 181, as signified by the row counter value greater than $Y_{ISO2}$, the column counter value is then incremented by one as represented by a block, 206. If the column counter does not obtain a value greater than a right border edge, 191, as determined from a value not exceeding $X_{ISO2}$, and as represented by a decision diamond, 207, procedural control returns to block 196 wherein the search array is loaded with the gray level values of pixels corresponding to the next column.

Downward and rightward pixel examination through isolation box 181 is continued according to the procedure described above until a black pixel as represented by decision diamond 200 has been detected. To verify that the pixel corresponds to a point on the animal image portion, the gray level values of 100 pixels immediately below the detected pixel are added together. If the sum of these gray level values does not equal zero, as represented by a decision diamond, 208, indicating that the detected pixel is not part the corresponding animal image, procedural control is returned to block 202 wherein the row counter value is incremented by one to continue searching through the array corresponding to the current column. If in the event the sum of gray level values beneath the detected black pixel does equal zero, the row counter value is compared with the value stored in the variable highest row as represented by a decision diamond, 210. If the row counter has a value less than the value of the variable highest row, the coordinates of the detected black pixel (column, row) are saved in memory with the variable highest row set at the row counter value as illustrated in a block, 212.

Upon saving the coordinates of the detected highest black pixel as represented in block 212 or, in the alternative, the detected black pixel does not have a row coordinate value less than the value stored in the variable highest row, as illustrated in decision diamond 210, the column counter value is incremented by one in a block, 214, and compared with the right border edge 191, as denoted by the value of $X_{ISO2}$, and as represented in a decision diamond, 216. Procedural control will return to block 196 if the column counter value does not exceed $X_{ISO2}$; otherwise, the coordinates stored in memory indicate the tail point, 193, as illustrated in FIG. 3C.

Figure 3D:
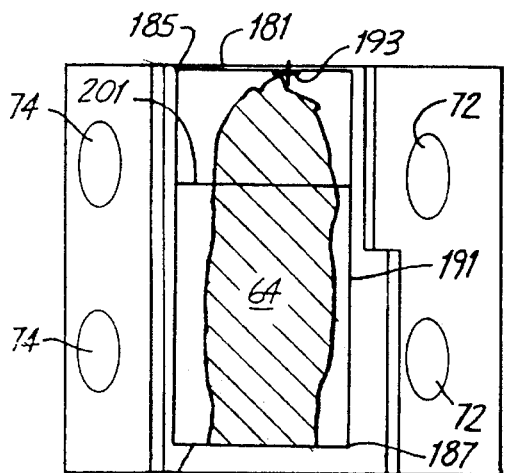

With tail point 193 located on the top image segregation representation, the "tail-rump height" distance, TR, previously calculated in block 186 is converted into the corresponding number of pixels for the top image segregation representation in order to locate a rump height row, 201, shown in FIG. 3D, that corresponds to the highest point 157 on the corresponding animal image portion illustrated in FIG. 2E. Rump height row 201 is determined from the following equation:

Equation 5:

$$F = (TR * FL2 / VOD2) * VLR2 * VPR2$$

where F represents the number of successive pixels on the segregated top image representation to be added to the column coordinate of the stored tail point 193; TR represents the tail-rump height distance calculated according to Equation 4 above; and FL2, VLR2, VPR2 and VOD2 represent system parameters described above. The quantity (TR*FL2/VOD2) represents the distance in millimeters on the CCD of camera 20 that is proportional to distance TR while VLR2 and VPR2 are system parameters needed to convert that proportional distance to a succession of pixels.

Figure 3E:
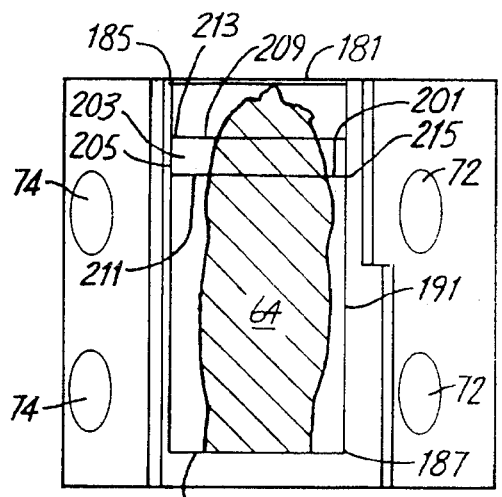
Figure 3F:
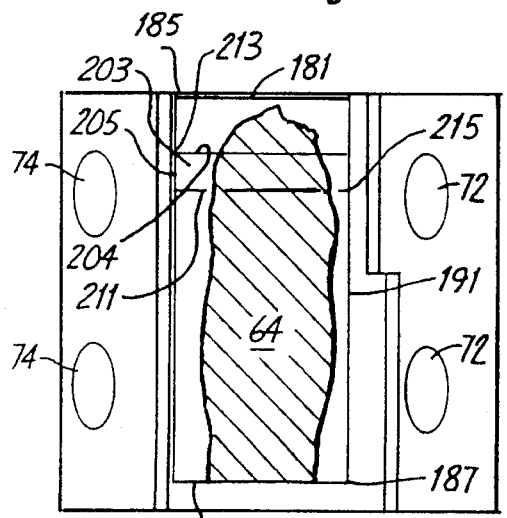

Next, a block, 222, represents the step of creating a top window, 203, as shown in FIG. 3E, from a portion of isolation box 181. Top window 203 includes a left and right border edges, 205, and 191, respectively, equal to that of isolation box 181 whereas upper and right border edges, 209, and, 211, extend rearwardly on the corresponding animal image portion from rump height row 201, three inches and nine inches, respectively. The location and dimension of top window 203 have been determined from prior research which has indicated the location of the widest point of the animal relative to the tail point 193. Upper border edge 209 and lower border edge 211 each are determined from the following equation:

Equation 6:

$$G=(H*FL2/VOD2)*VLR2*VPR2$$

where G represents the number of successive pixels on the segregated top image representation to be subtracted from the value of the rump height row 201; H represents the actual length in inches to be converted, i.e. 3 or inches; and FL2, VLR2, VPR2 and VOD2 represent system parameters described above. The quantity (H*FL2/VOD2) represents the distance in millimeters on the CCD of camera 20 that is proportional to distance H while VLR2 and VPR2 are system parameters needed to convert that proportional distance to a succession of pixels.

Top window 203 comprises a pixel matrix having $X_{ISO2}$ columns and $Y_{TW1}$ rows wherein $Y_{TW1}$ equals the number of successive pixels between the upper and lower border edges 209 and 211, respectively, calculated above. An upper left corner, 213, has pixel coordinates (1, upper border edge row) and a lower right corner, 215, has pixel coordinates ($X_{ISO2}$, rump height row). Each pixel row of top window 203 is then examined, as represented in FIGS. 5A and 5B to locate the pixel row corresponding to the animal's greatest rump width, herein also referred as "RW".

Figure 5A:
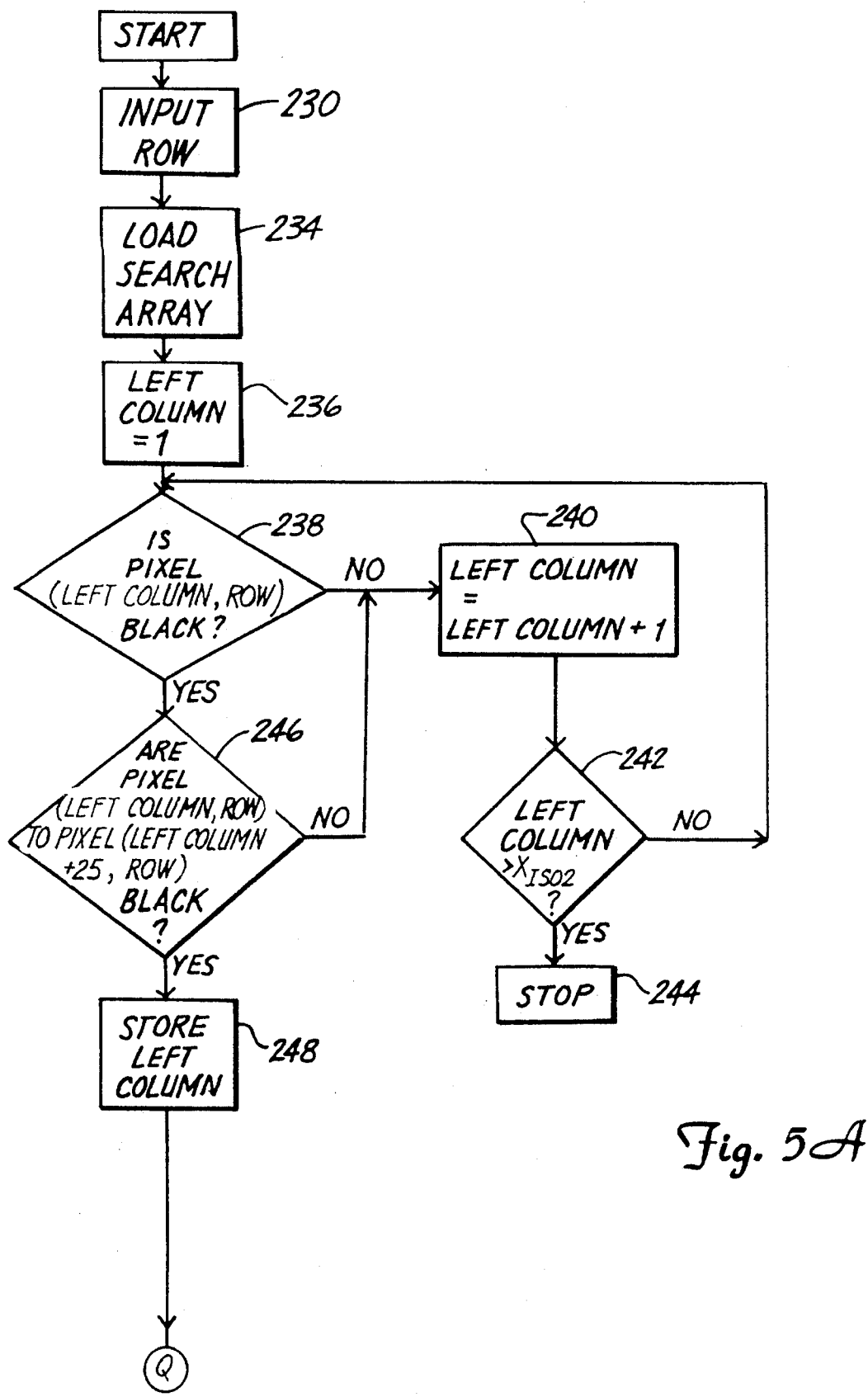
Figure 5B:
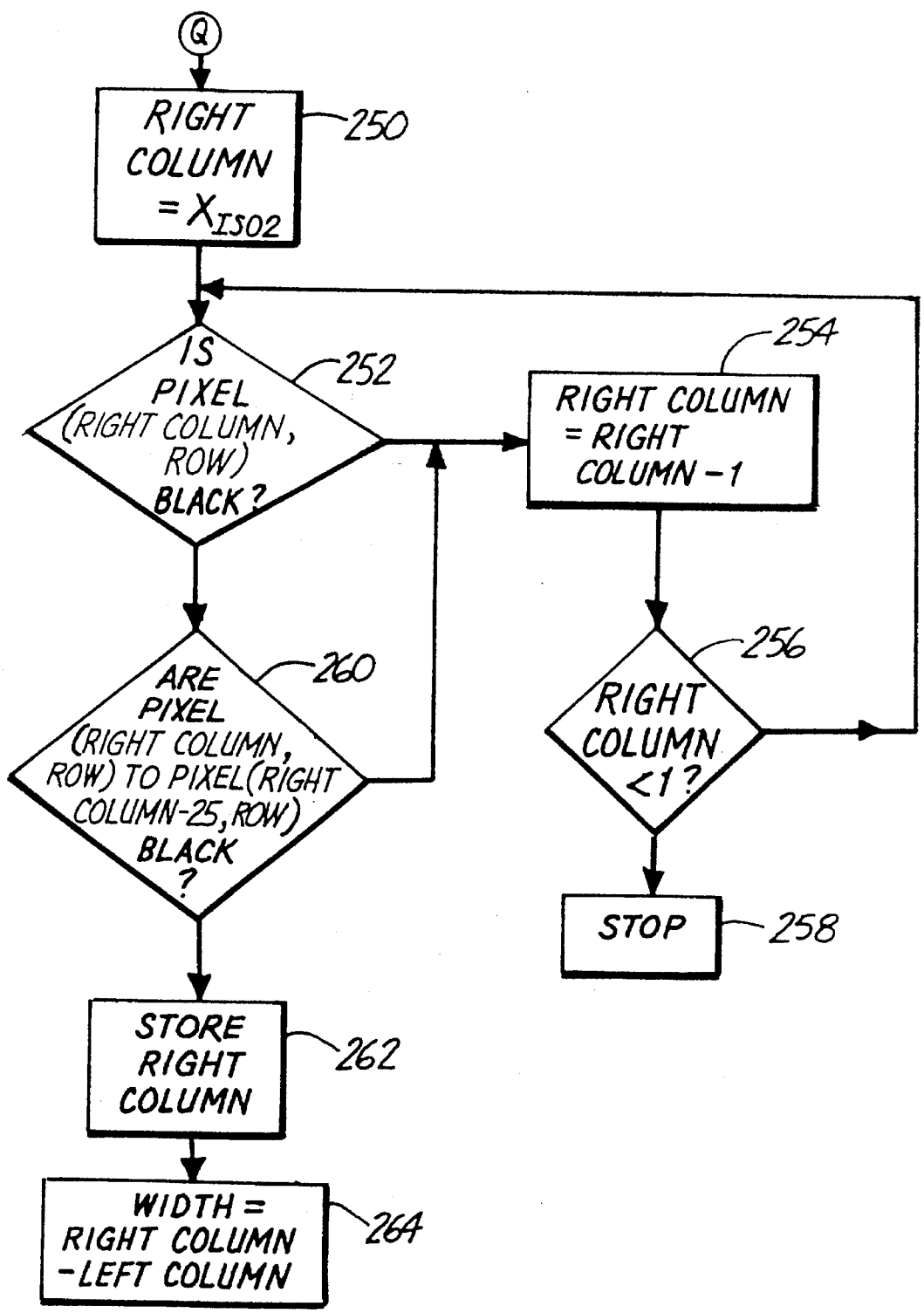

Referring to FIG. 5A, a block, 230, represents initialization of a counter "row" with the corresponding row to be searched. A one dimensional search array is then loaded with the gray level values of each pixel contained within the row designated by the row counter value as represented by a block, 234.

A counter "left column" is then initialized at a value of one as represented by a block, 236, and the corresponding element value indexed by the left column counter which also corresponds to the pixel (left column, row) is examined for a gray level value equal to zero which denotes the occurrence of a black pixel. A decision diamond, 238, represents examination of the pixel and if this pixel is not black, the left column counter value is incremented by one as represented by a block, 240. Provided that the left column counter value does not exceed $X_{ISO2}$, the right border edge 191, as represented by a decision diamond, 242, procedural control is returned to block 238 with continued searching progression through the one dimensional array corresponding to the current row. If, however, the left column counter value exceeds the right border edge 191, as signified by the left column counter value greater than $X_{ISO2}$, searching is stopped at a block, 244, and an appropriate warning or indication is initiated by processing and analysis station 22.

Rightward pixel examination through the one dimensional array corresponding to the current row is continued according to the procedure described above until a black pixel, as represented by decision diamond 238, has been detected. To verify that the pixel corresponds to a point on the left edge of the animal image portion, the gray level values of 25 pixels immediately to the right of the detected pixel are added together as represented by a decision diamond, 246. If the sum of these gray level values does not equal zero, indicating that the detected pixel is not part of the left edge of the animal image portion, procedural control is returned to block 240 wherein the left column counter value is incremented by one to continue searching through the one dimensional array corresponding to rightward progression through the current row. If in the event the sum of gray level values to the right of the detected pixel does equal zero, the left column counter value is stored in memory as represented by a block, 248.

Referring to FIG. 5B, the right edge of the animal image portion is located with a similar procedure. A counter "right column" is initialized at a value of $X_{ISO2}$ as represented by a block, 250, and the corresponding element value indexed by the right column counter which also corresponds to the pixel having as coordinates (right column, row) is examined for a gray level equal to zero which denotes the occurrence of a black pixel. A decision diamond, 252, represents examination of the pixel and if this pixel is not black, the right column counter value is decremented by one as represented by a block, 254. Provided that the right column counter value is not less than 1, the left border edge 205, as represented by a decision diamond, 256, procedural control is returned to decision diamond 252 with continued searching through the one dimensional array corresponding to leftward progression through the current row of pixels. If, however, the right column counter value is left of the left border edge 205, as signified by the right column counter value less than one, searching is stopped at a block, 258, and an appropriate warning or indication is initiated by processing and analysis station 22.

Leftward pixel examination through the current row is continued according to the procedure described above until a black pixel as represented by decision diamond 252 has been detected. To verify that the pixel corresponds to the right edge of the animal image portion, the gray level values of 25 pixels immediately to the left of the detected pixel are added together as represented by a decision diamond, 260. If the sum of these gray level values does not equal zero, indicating that the detected pixel is not part of the right edge of the animal, procedural control is returned to block 254 wherein the right column counter value is decremented by one to continue searching through the one dimensional array corresponding to leftward progression through the current row of pixels. If in the event the sum of gray level values to the left of the detected pixel does equal zero, the right column counter value is stored in memory as represented by a block, 262. The width of the animal at this particular row is calculated by subtracting the stored left column counter value from the stored right column counter value as represented by a block, 264.

Using the procedure illustrated in FIG. 5A and 5B and described above, the width of the animal is calculated for each row of the top window 203. The greatest width is determined to be the "rump width", herein also referred as "RW", as represented by a block, 280, in FIG. 4H. A block, 282, then represents determination of a corresponding value in inches using the following equation:

Equation 7:

$$RW=(I/HPR2/HLR2)*(VOD2/FL2)$$

where I represents the number of successive horizontal pixels comprising the rump width. HPR2, HLR2, FL2 and VOD2 represent system parameters described above. The quantity (I/HPR2/HLR2) represents the distance in millimeters on the CCD of camera 20 that is proportional to the succession of pixels denoted by I while the quantity (VOD2/FL2) is used to convert that proportional distance to a corresponding distance in inches.

It should be noted that when a particular muscle is indicated as a site for recording of muscle width such as rump width and other muscle widths to be located below, it is done for the purpose of denoting an anatomical area of interest and not for the purpose of measurement of one particular muscle. Research has indicated that when the musculoskeletal development of an animal, such as cattle, is used for an indication of specific traits or performance characteristics, which are influenced by the animal's hormonal activity, it is better to group muscle systems into anatomical regions rather than consider individual muscle systems in the region of interest because the musculoskeletal development of an anatomical area of interest is a superior indicator of hormonal activity within the animal.

Figure 3G:
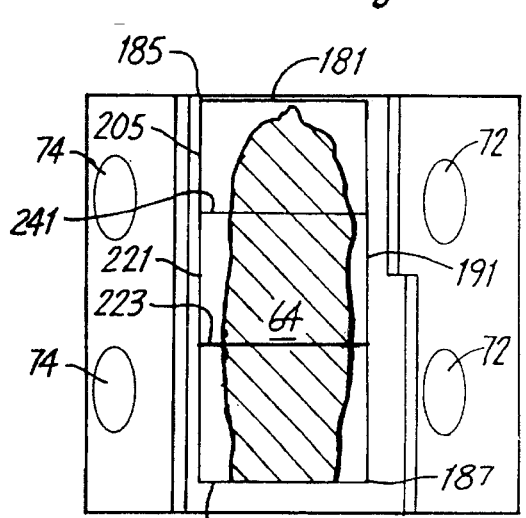
Figure 4H:
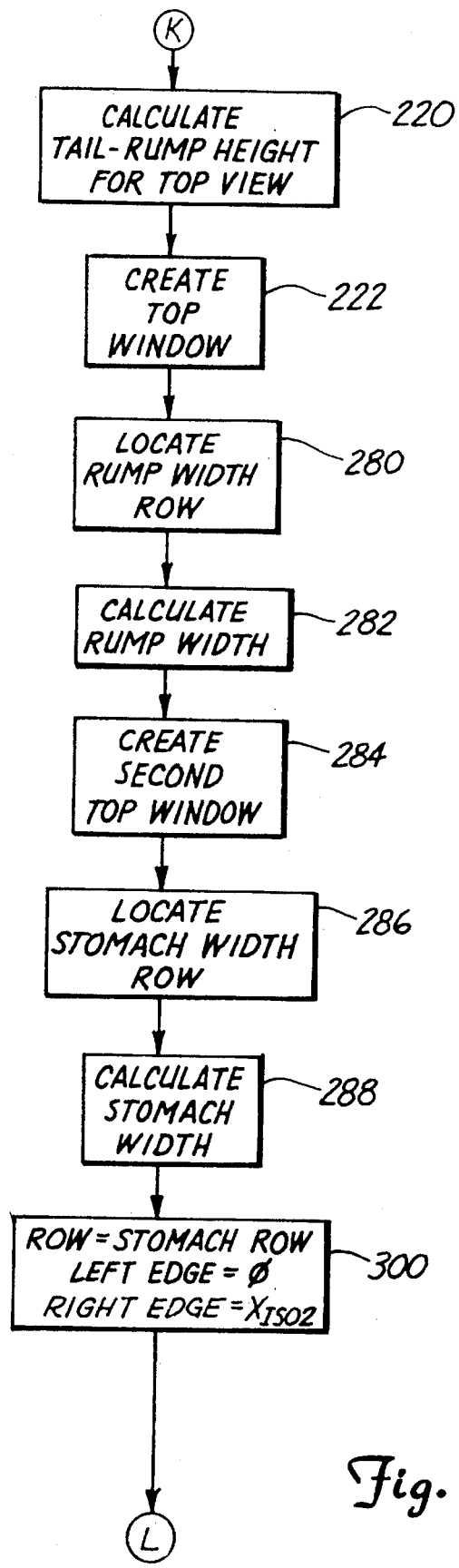

Referring to FIG. 3G, a second top window, 221, is then defined from a portion of isolation box 181 as represented by a block, 284, in FIG. 4H. Second top window 221 comprises a pixel matrix having $X_{ISO2}$ columns and $Y_{TW2}$ rows wherein $Y_{TW2}$ equals the number of pixels between rump height row 201 and lower border edge 189. An upper left corner, 241, has pixel coordinates (1, rump height row) and the lower right corner 187 has coordinates ($X_{ISO2}$, $Y_{ISO2}$).

Referring to FIG. 4H, a block, 286, represents examination of each row of second top window 221 according to the procedure described above and illustrated in FIGS. 5A and 5B to locate the row having the greatest width which is determined to be the animal's "stomach width", herein also referred as "STW". A block, 288, represents conversion of the stomach width to inches as determined from the following equation:

Equation 8:

$$STW=(J/HPR2/HLR2)*(VOD2/FL2)$$

where J represents the number of successive horizontal pixels comprising the stomach width. HPR2, HLR2, FL2 and VOD2 represent system parameters described above. The quantity (J/HPR2/HLR2) represents the distance in millimeters on the CCD of camera 20 that is proportional to the succession of pixels denoted by J while the quantity (VOD2/FL2) is used to convert that proportional distance to a corresponding distance in inches.

Once a stomach row, 223, illustrated in FIG. 3G, has been located within the second top window 221, the narrowest portion of the animal between stomach row 223 and the lower border edge 189 is then located. This reference location is called the "indent row" and indicates the start of the shoulder region of the animal.

A block, 300, illustrated in FIG. 4H represents initialization of a counter "row" with the value corresponding to the stomach row 223, located above; variable "left edge" with a value of zero which represents left border edge 205; and variable "right edge" with $X_{ISO2}$ which represents right border edge 191. Referring next to FIG. 4I, a one dimensional search array is then loaded with the gray level values of each pixel contained within the row designated by the row counter value as represented by a block, 301.

A counter "left column" is then initialized at a value of one as represented by a block, 302, and the corresponding element value indexed by the left column counter in the search array which also corresponds to the pixel (left column, row) is examined for a gray level value equal to zero which denotes the occurrence of a black pixel. A decision diamond, 303, represents examination of the pixel and if this pixel is not black, the left counter value is incremented by one as represented by a block, 304. Provided that the left counter value does not exceed $X_{ISO2}$, the right border edge 191, as represented by a decision diamond, 305, procedural control is returned to decision diamond 303 with continued searching progression through the one dimensional array corresponding to rightward progression through the current row of pixels. If, however, the left column counter value exceeds the right border 191, as signified by the left column counter value greater than $X_{ISO2}$, searching is stopped at a block, 306, and an appropriate warning or indication is initiated by processing and analysis station 22.

Rightward pixel examination through the current row is continued according to the procedure described above until a black pixel as represented by decision diamond 303 has been detected. To verify that the pixel corresponds to the left edge of the animal image portion, the gray level values of 25 pixels immediately to the right of the detected pixel are added together as represented by a decision diamond, 307. If the sum of these gray level values does not equal zero, indicating that the detected pixel is not part of the left edge of the animal, procedural control is returned to block 304 wherein the left column counter value is incremented by one to continue searching through the one dimensional array corresponding to rightward progression through the current row of pixels. If in the event the sum of gray level values to the right of the detected pixel does equal zero, the left column counter value is compared to the value stored in the left edge variable as represented by a block, 308. If the left column counter value exceeds the value stored in the left edge variable, indicating that the current pixel is to the right of any previously detected left edge pixel, a block, 309, represents storing the coordinates of the current pixel wherein the left edge variable value is also set to the value of left column counter.

Figure 4J:
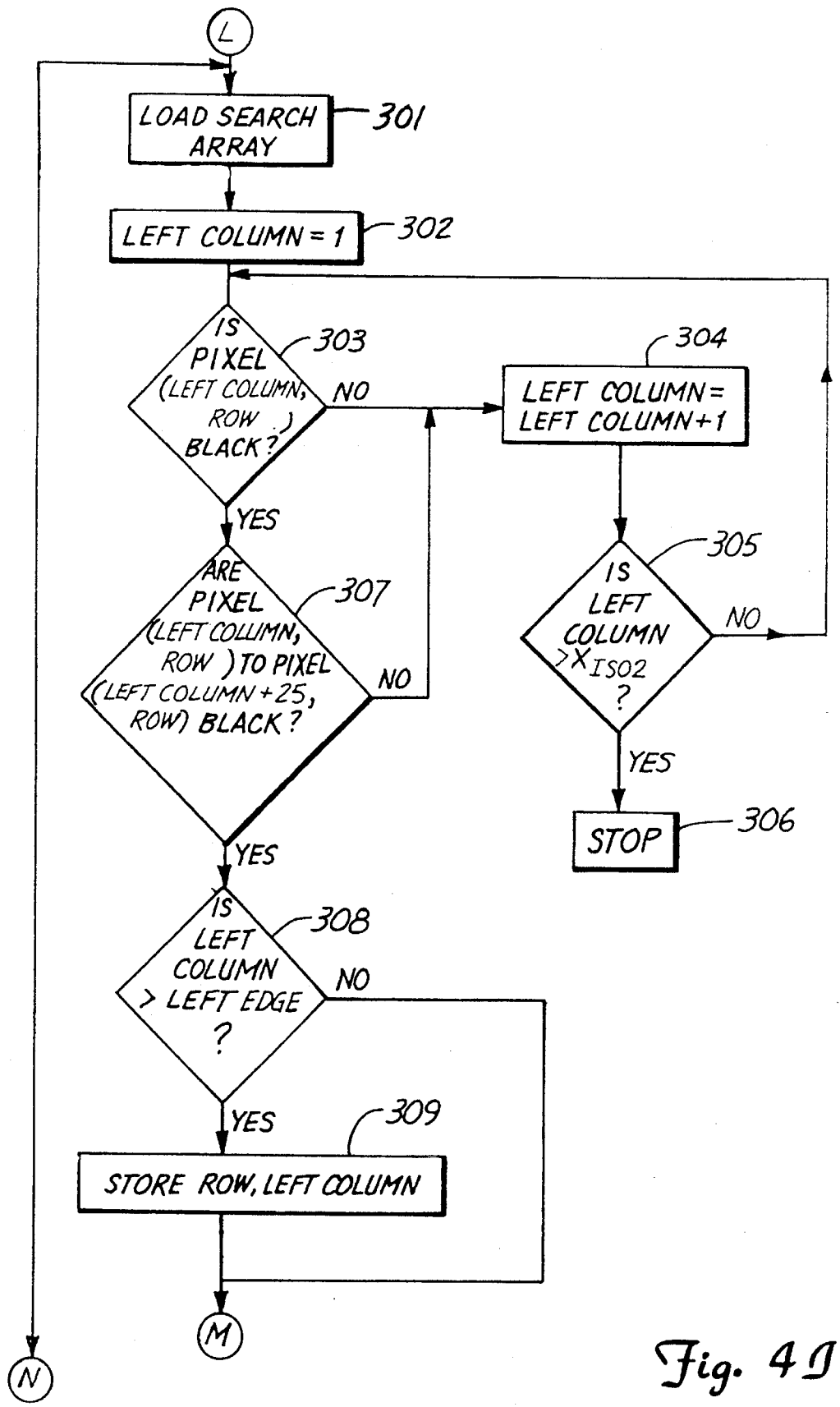
Figure 4J:
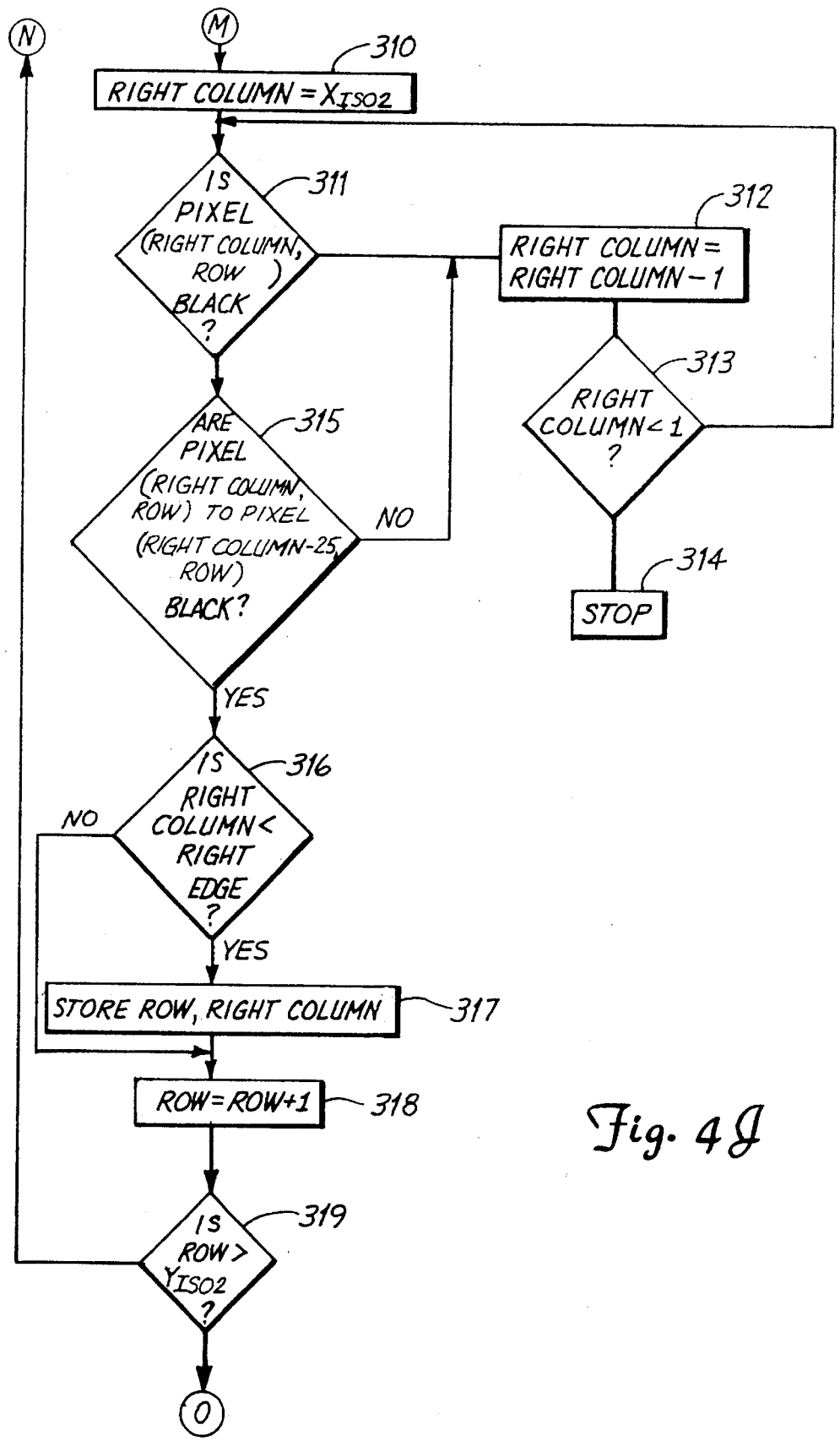

Next, location of the right edge pixel is determined. Referring to FIG. 4J, a counter "right column" is initialized at a value of $X_{ISO2}$ as represented by a block, 310, and the corresponding element value indexed by the right column counter in the search array which corresponds to the pixel (right column, row) is examined for a gray level value equal to zero which denotes the occurrence of a black pixel. A decision diamond, 311, represents examination of the pixel and if this pixel is not black, the right counter value is decremented by one as represented by a block, 312. Provided that the right counter value is not less than 1, or left of the left border edge 205, as represented by a decision diamond, 313, procedural control is returned to decision diamond 311 with continued searching through the one dimensional array corresponding to leftward progression through the current row of pixels. If, however, the right column counter value is left of the left border edge 205, as signified by the right column counter value less than 1, searching is stopped at a block, 314, and an appropriate warning or indication is initiated by processing and analysis station 22.

Leftward pixel examination through the current row is continued according to the procedure described above until a black pixel as represented by decision diamond 311 has been detected. To verify that the pixel corresponds to the right edge of the animal image portion, the gray level values of 25 pixels immediately to the left of the detected pixel are added together as represented by a decision diamond, 315. If the sum of these gray level values does not equal zero, indicating that the detected pixel is not part of the right edge of the animal image portion, procedural control is returned to block 312 wherein the right column counter value is decremented by one to continue searching through the one dimensional array corresponding to leftward progression through the current row of pixels. If in the event the sum of gray level values to the left of the detected pixel does equal zero, the right column counter value is compared to the value stored in the right edge variable as represented by a block, 316. If the right column counter value is less than the value of the right edge variable, indicating that the current pixel is to the left of any previously detected left edge pixel, a block, 317, represents storing the coordinates of the current pixel wherein the right edge variable value is set to value of the right column counter.

Figure 3H:
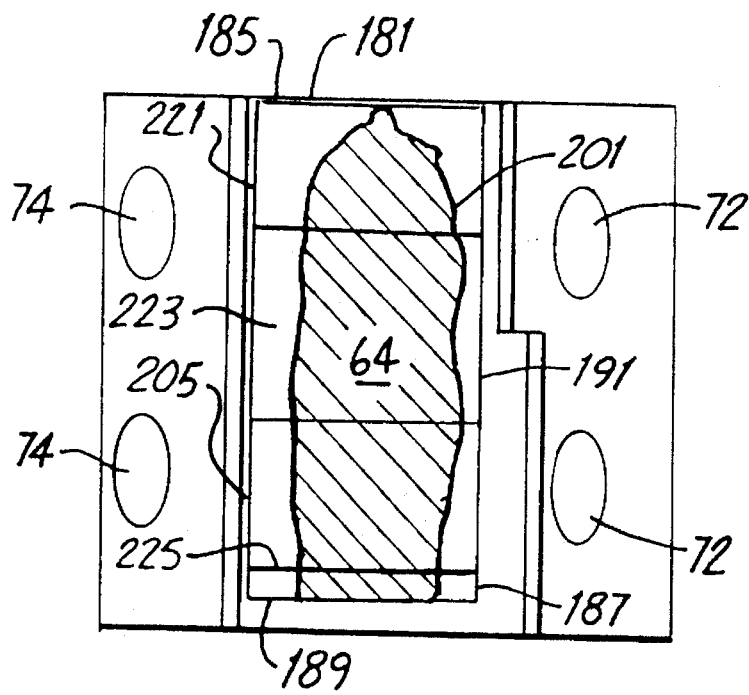
Figure 3I:
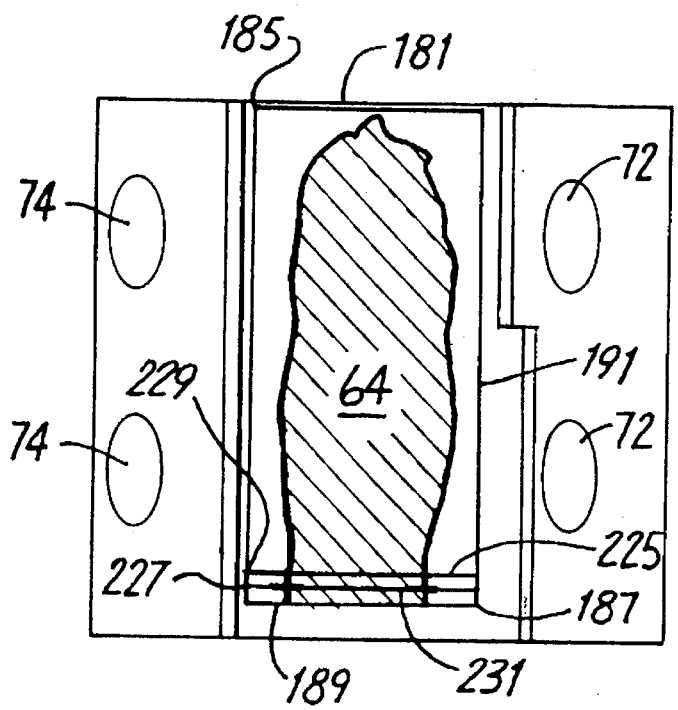

Next, the row counter value is incremented by one, as represented by a block, 318. If the row counter does not exceed $Y_{ISO2}$, the lower border edge 189, as represented by a decision diamond, 319, the remaining rows of second top window 221 are examined. If, however, the row counter value does exceed $Y_{ISO2}$, indicating that all rows have been examined, then an indent row variable is set, as represented by a block, 320 in FIG. 4K, with the corresponding row coordinate of the left or right edge stored coordinates that is farthest away from lower border edge 1189. In other words, the indent row variable is set equal to the lowest row value of either the left edge variable or the right edge variable. The above described procedure compensates for situations in which the backbone of the animal is not arranged parallel to the longitudinal axis of the chute, or in other words when the animal is slightly bent in the chute. FIG. 3H illustrates location of an indent row, 225, located according to the above prescribed procedure.

The indent row 225 is used as the upper boundary edge of a third window defined from a portion of isolation box 181 that extends forwardly upon the animal to lower edge 189.

Figure 4K:
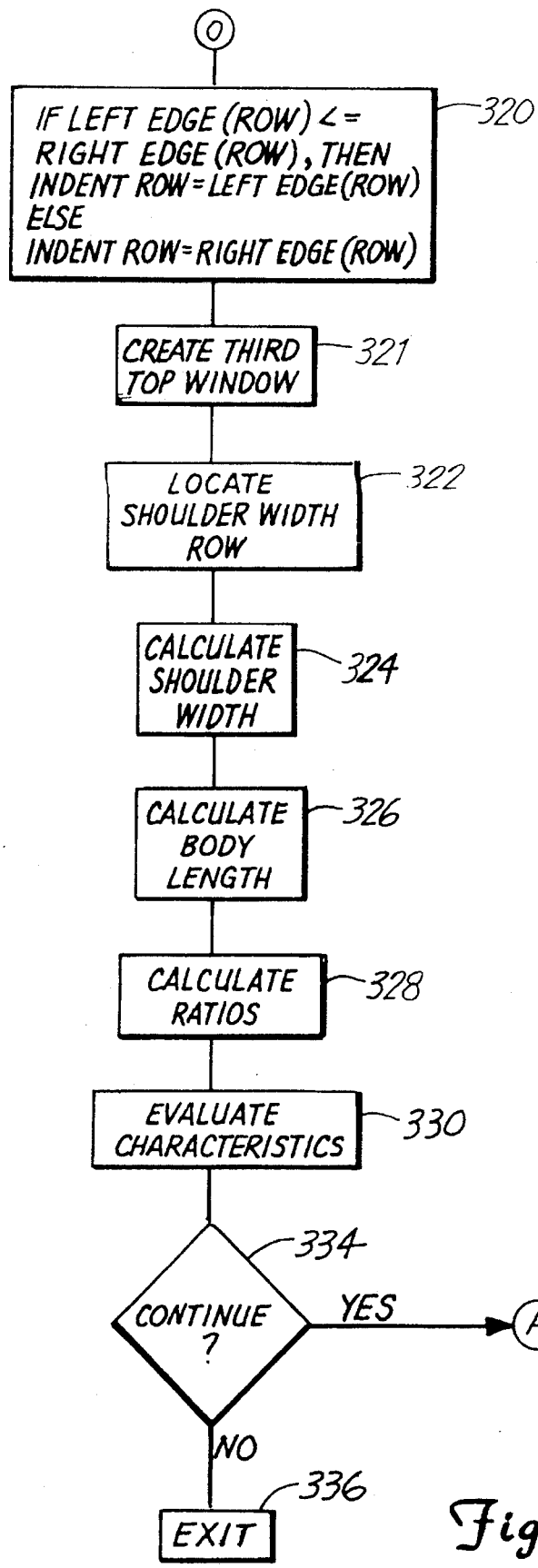

The value of the variable indent row is provided as input to a block, 321, that represents the step of creating a third top window, 227. Third top window 227 comprises a pixel matrix having $X_{ISO2}$ columns and $Y_{TW3}$ rows wherein $Y_{TW3}$ equals the number of pixels between indent row 225, located above, and lower border edge 189. An upper left corner, 229, has pixel coordinates (1, indent row) and the lower right corner 187 has pixel coordinates ($X_{ISO2}$, $Y_{ISO2}$). A block, 322, in FIG. 4K represents examination of each row of third top window 227 according to the procedure described above and illustrated in FIGS. 5A and 5B. The row corresponding to the widest portion of the animal is determined to be the "shoulder width", herein also referred as "SHW", of the animal A block, 324, in FIG. 4K represents conversion of the shoulder width to inches as determined from the following equation:

Equation 9:

$$SHW=(K/HPR2/HLR2)*(VOD2/FL2)$$

where K represents the number of successive horizontal pixels comprising the shoulder width. HPR2, HLR2, FL2 and VOD2 represent system parameters described above. The quantity (K/HPR2/HLR2) represents the distance in millimeters on the CCD of camera 20 that is proportional to the succession of pixels denoted by K while the quantity (VOD2/FL2) is used to convert that proportional distance to a corresponding distance in inches.

Next, a block, 326, represents the step of calculating the animal's "body length", herein also referred as "BL". The body length is calculated by subtracting the rump height row 201 value from the shoulder width row 231 value. The body length, BL, is converted to inches with the following equation:

Equation 10:

$$BL=(L/VPR2/VLR2)*(VOD2/FL2)$$

where L represents the number of successive vertical pixels comprising the body length. VPR2, VLR2, FL2 and VOD2 represent system parameters described above. The quantity (L/VPR2/VLR2) represents the distance in millimeters on the CCD of camera 20 that is proportional to the succession of pixels denoted by L while the quantity (VOD2/FL2) is used to convert that proportional distance to a corresponding distance in inches.

The measurement data generated by the system, specifically, the animal's: rump height (RH); rump width (RW); shoulder width (SHW); and body length (BL) are used to evaluate and predict characteristic traits of each animal. The characteristic traits of each animal are determined from animal indicia or characteristic indicating ratios formed from the above listed physical measurements. In the preferred embodiment, four such ratios are formed wherein a shoulder muscle to bone ratio, herein also referred as "SMB", represents structural development in the fore quarter region; a rump muscle to bone ratio, herein also referred as "RMB", represents structural development in the rear quarter region; a musculoskeletal development per unit length ratio, herein referred as "MSDL", represents structural development as related to the animal's body length; and a musculoskeletal development per unit height ratio, herein referred as "MSDH", represents structural development as related to the animal's rump height. The four characteristic indicating ratios are determined, as represented by a block, 328, in FIG. 4K, from the following equations:

Equation 11:

$$SHW=SHW/RH$$

Equation 12:

$$RMB=RW/RH$$

Equation 13:

$$MSDL=(SMB+RMB)/BL$$

Equation 14:

$$MSDH=(SMB+RMB)/RH$$

It is believed that at least two linear equations can be formed from the ratios listed above to define two functional characteristic equations. A first functional characteristic equation represented as follows:

Equation 15:

$$CV = (a*SMB) + (b*RMB) + (c*MSDL) + (d*MSDH) + e$$

provides a numerical value representing carcass value, herein referred as "CV", which in turn is used to predict a carcass grade, or an indication for the quality of meat present on the animal; a yield grade, or an indication for the quantity of meat present on the animal; and a cutability factor, or an indication of lean to fat on the bone. Coefficients a, b, c, d are weighting factors used to emphasis one or more of the four characteristic indicating ratios. Coefficient e is used as an adjustment constant to provide a numerical value in a particular range of values, for example to create a range of values from one to ten.

In the preferred embodiment, two different sets of weighting coefficients are provided wherein one set is provided for each sex of the animal. A first set of carcass value coefficients ($a_M$, $b_M$, $c_M$, $d_M$, $e_M$) are provided for the male gender of the animal while a second set of carcass value coefficients ($a_F$, $b_F$, $c_F$, $d_F$, $e_F$) are provided for the female gender of the animal. Separate sets of carcass value coefficients are provided in order to isolate similar economically valuable characteristics of each particular gender of the animal such that animals of a particular sex can be accurately compared. For example, as stated above, characteristic indicating ratio SMB provides an indicative value that relates to the animal's shoulder muscles. In animals, such as cattle, this particular area is well developed in the male gender of those animals that have reached or surpassed the age of puberty due in part to the presence of both growth hormones and male sex hormones (testosterone). In contrast, the characteristic indicating ratio RMB provides an indicative value that relates to the animal's rump muscles. Using cattle again as an example, this particular area is well developed in the female gender of those animals that have reached or surpassed the age of puberty due in part to the presence of both growth hormones and female sex hormones (estrogen). Since each gender develops differently from the age of puberty, emphasizing different structural characteristics, separate sets of coefficients are provided in order to compare accurately like animals of a particular herd, or like animals of different herds.

In a further preferred embodiment, if processing and analysis is desired for animals that have not yet reached the age of puberty where the physical structures of both males and females are substantially equivalent, then a third set of carcass value coefficients ($a_{MF}$, $b_{MF}$, $c_{MF}$, $d_{MF}$, $e_{MF}$) can be used wherein the subscript "MF" represents both male and female animals that have not reached puberty.

As stated above, carcass value coefficients of the first set ($a_M$, $b_M$, $c_M$, $d_M$, $e_M$), second set ($a_F$, $b_F$, $c_F$, $d_F$, $e_F$) and third set ($a_{MF}$, $b_{MF}$, $c_{MF}$, $d_{MF}$, $e_{MF}$) have numerical values. The corresponding numerical values of each coefficient of each set of coefficients is determined by analyzing an appropriate number of animals that meet those age and gender requirements to obtain the measurements necessary to calculate the four characteristic indicating ratios, SMB, RMB, MSDL and MSDH. In other words, if the carcass value coefficients for male animals ($a_M$, $b_M$, $c_M$, $d_M$, $e_M$) are desired, then an appropriate number of male animals that have reached or surpassed the age of puberty would be analyzed to obtain the four characteristic indicating ratios for each individual animal.

The numerical value of each coefficient can be determined from any suitable mathematical convergence technique. In the preferred embodiment, a multiple linear regression model using a least square estimator technique is used, as represented by the following equations:

Equation 16:

$$e*N + d*\sum_{i=1}^{N} MSDH_i + c*\sum_{i=1}^{N} MSDL_i + b*\sum_{i=1}^{N} RMB_i + a*\sum_{i=1}^{N} SMB_i = \sum_{i=1}^{N} CV_i$$

Equation 17:

$$e*\sum_{i=1}^{N} MSDH_i + d*\sum_{i=1}^{N} (MSDH_i)^2 + c*\sum_{i=1}^{N} MSDL_i*MSDH_i + b*\sum_{i=1}^{N} RMB_i*MSDH_i + a*\sum_{i=1}^{N} SMB_i*MSDH_i = \sum_{i=1}^{N} CV_i*MSDH_i$$

Equation 18:

$$e*\sum_{i=1}^{N} MSDL_i + d*\sum_{i=1}^{N} MSDH_i*MSDL_i + c*\sum_{i=1}^{N} (MSDL_i)^2 + b*\sum_{i=1}^{N} RMB_i*MSDL_i + a*\sum_{i=1}^{N} SMB_i*MSDL_i = \sum_{i=1}^{N} CV_i*MSDL_i$$

Equation 19:

$$e*\sum_{i=1}^{N} RMB_i + d*\sum_{i=1}^{N} MSDH_i*RMB_i + c*\sum_{i=1}^{N} MSDL_i*RMB_i + b*\sum_{i=1}^{N} (RMB_i)^2 + a*\sum_{i=1}^{N} SMB_i*RMB_i = \sum_{i=1}^{N} CV_i*RMB_i$$

Equation 20:

$$e*\sum_{i=1}^{N} SMB_i + d*\sum_{i=1}^{N} MSDH_i*SMB_i + c*\sum_{i=1}^{N} MSDL_i*SMB_i + b*\sum_{i=1}^{N} RMB_i*SMB_i + a*\sum_{i=1}^{N} (SMB_i)^2 = \sum_{i=1}^{N} CV_i*SMB_i$$

In these equations, coefficients a, b, c, d, e represent the set of carcass value coefficients to be determined, either ($a_M$, $b_M$, $c_M$, $d_M$, $e_M$), ($a_F$, $b_F$, $c_F$, $d_F$, $e_F$) or ($a_{MF}$, $b_{MF}$, $c_{MF}$, $d_{MF}$, $e_{MF}$); "N" represents the total number of individual animals that meet the age and gender requirements for the particular set of coefficients to be determined, for example, if numerical values are desired for the carcass value coefficients ($a_M$, $b_M$, $c_M$, $d_M$, $e_M$), then N equals the total number of male animals that have at least reached the age of puberty; subscript "i" represents a particular individual of the total number of animals; $SMB_i$, $RMB_i$, $MSDL_i$ and $MSDH_i$ are the four characteristic indicating ratios for each particular animal determined from the above listed equations; and $CV_i$ is a gauged numerical value of carcass value, within a given range of values, for each particular animal. For example, if it is desired to analyze cattle using a range of values from one to ten wherein one represents an animal having a low overall carcass value and ten represents an animal having a high overall carcass value, then each animal would be analyzed to obtain the four characteristic indicating ratios listed above with $CV_i$ for that particular animal gauged or assigned a corresponding value from one to ten. After a value has been obtained for $SMB_i$, $RMB_i$, $MSDL_i$, $MSDH_i$ and $CV_i$ for each animal, then using known mathematical techniques, the equations listed above can be solved simultaneously for the coefficients (a, b, c, d, e).

Similarly, a second functional characteristic equation, herein referred as "PA", and represented as follows:

Equation 21:

$$PA = (f*SMB) + (g*RMB) + (h*MSDL) + (j*MSDH) + k$$

provides a numerical value representing production audit which in turn is used to predict feed conversion efficiency of the animal; a fertility rating, or how well the animal will reproduce; and when each individual result is combined with all animals of a particular herd, a herd health care score. Coefficients f, g, h, j are weighting factors used to emphasize one or more of the four characteristic indicating ratios. Coefficient k is used as an adjustment constant to provide a numerical value in a particular range of values, for example to create a range of values from one to ten.

As with the carcass value coefficients listed above, two different sets of production audit coefficients are provided in the preferred embodiment wherein one set is provided for each sex of the animal. A first set of production audit coefficients ($f_M$, $g_M$, $h_M$, $j_M$, $k_M$) are provided for the male gender of the animal while a second set of production audit coefficients ($f_F$, $g_F$, $h_F$, $j_F$, $k_F$) are provided for the female gender of the animal. As with the carcass value coefficients above, the separate sets of production audit coefficients are provided in order to isolate similar economically valuable characteristics of each particular gender of the animal such that animals of a particular sex can be accurately compared.

In a further preferred embodiment, if processing and analysis is desired for animals that have not yet reached the age of puberty wherein the physical structures of both males and females are substantially equivalent, then a third set of production audit coefficients ($f_{MF}$, $g_{MF}$, $h_{MF}$, $j_{MF}$, $k_{MF}$) can be used wherein the subscript "MF" represents both male and female animals that have not reached puberty.

As with the sets of carcass value coefficients listed above, the production audit coefficients of the first set ($f_M$, $g_M$, $h_M$, $j_M$, $k_M$), second set ($f_F$, $g_F$, $h_F$, $j_F$, $k_F$) and third set ($f_{MF}$, $g_{MF}$, $h_{MF}$, $j_{MF}$, $k_{MF}$) have numerical values. The corresponding numerical values of each coefficient of each set of coefficients is determined by analyzing an appropriate number of animals that meet the age and gender requirements to obtain the measurements necessary to calculate the four characteristic indicating ratios, SMB, RMB, MSDL and MSDH.

The numerical values of each coefficient can be determined from any suitable mathematical convergence technique. In the preferred embodiment, a multiple linear regression model using a least square estimator technique is used, as represented by the following equations:

Equation 22:

$$k*N + j*\sum_{i=1}^{N} MSDH_i + h*\sum_{i=1}^{N} MSDL_i + g*\sum_{i=1}^{N} RMB_i + f*\sum_{i=1}^{N} SMB_i = \sum_{i=1}^{N} PA_i$$

Equation 23:

$$k*\sum_{i=1}^{N} MSDH_i + j*\sum_{i=1}^{N} (MSDH_i)^2 + h*\sum_{i=1}^{N} MSDL_i*MSDH_i + g*\sum_{i=1}^{N} RMB_i*MSDH_i + f*\sum_{i=1}^{N} SMB_i*MSDH_i = \sum_{i=1}^{N} PA_i*MSDH_i$$

Equation 24:

$$k*\sum_{i=1}^{N} MSDL_i + j*\sum_{i=1}^{N} MSDH_i*MSDL_i + h*\sum_{i=1}^{N} (MSDL_i)^2 + g*\sum_{i=1}^{N} RMB_i*MSDL_i + f*\sum_{i=1}^{N} SMB_i*MSDL_i = \sum_{i=1}^{N} PA_i*MSDL_i$$

Equation 25:

$$k*\sum_{i=1}^{N} RMB_i + j*\sum_{i=1}^{N} MSDH_i*RMB_i + h*\sum_{i=1}^{N} MSDL_i*RMB_i + g*\sum_{i=1}^{N} (RMB_i)^2 + f*\sum_{i=1}^{N} SMB_i*RMB_i = \sum_{i=1}^{N} PA_i*RMB_i$$

Equation 26:

$$k*\sum_{i=1}^{N} SMB_i + j*\sum_{i=1}^{N} MSDH_i*SMB_i + h*\sum_{i=1}^{N} MSDL_i*SMB_i + g*\sum_{i=1}^{N} RMB_i*SMB_i + f*\sum_{i=1}^{N} (SMB_i)^2 = \sum_{i=1}^{N} PA_i*SMB_i$$

In these equations, coefficients f, g, h, j, k represent the set of production audit coefficients to be determined, either ($f_M$, $g_M$, $h_M$, $j_M$, $k_M$), ($f_F$, $g_F$, $h_F$, $j_F$, $k_F$) or ($f_{MF}$, $g_{MF}$, $h_{MF}$, $j_{MF}$, $k_{MF}$); "N" represents the total number of individual animals that meet the requirements for age and gender of the particular coefficients to be determined, for example, if numerical values are desired for the production audit coefficients ($f_M$, $g_M$, $h_M$, $j_M$, $k_M$), then N equals the total number of male animals that have at least reached the age of puberty; subscript "i" represents a particular individual of the total number of animals; $SMB_i$, $RMB_i$, $MSDL_i$ and $MSDH_i$ are the four characteristic indicating ratios for each particular animal used in determination of the corresponding set of production audit coefficients and determined from the above listed equations; and $PA_i$ is a gauged numerical production audit value, within a given range of values, for each particular animal. For example, if it is desired to analyze cattle using a range of values from one to ten wherein one represents an animal having a low overall production audit value and ten represents an animal having a high overall production audit value, then each animal would be analyzed to obtain the four characteristic indicating ratios listed above with $PA_i$ for that particular animal gauged or assigned a corresponding value from one to ten. After a value has been obtained for $SMB_i$, $RMB_i$, $MSDL_i$, $MSDH_i$ and $PA_i$ for each animal, then using known mathematical techniques, the equations listed above can be solved simultaneously for the coefficients (f, g, h, j, k).

Referring back to FIG. 4K, a block, 330, represents the step of evaluating the animal using Equations 15 and 21 for determination of the carcass value and production audit values, respectively, wherein given the age and gender of the animal, the appropriate set of carcass value and production audit coefficients are used. Calculated numerical values for carcass value and production audit are displayed on monitor 42 or monitor 44 and stored on any convenient storage device such as a portable magnetic memory disk, 332, on computer means 40 illustrated in FIG. 1A.

A decision diamond, 334, illustrated in FIG. 4K, represents continuing the analysis procedure for another animal. If another animal is to be analyzed, procedural control returns to decision diamond 104 in FIG. 4A; otherwise, the procedure 100 is stopped at a block, 336, labeled "EXIT".

The calculated numerical values for carcass value and production audit of each animal can be compared with corresponding values for other like animals from the same or a different herd. In addition, the calculated values can be grouped together to determine a herd carcass value or a herd production audit value. It is believed that use of the present system herein disclosed will provide efficient, accurate physical measurements which correlate to predictable characteristics of animals and their offspring.

Although the present invention has been described with reference to preferred embodiments, workers skilled in the art will recognize that changes may be made in form and detail without departing from the spirit and scope of the invention.

What is claimed is:

1. A method for evaluating changeable configuration bodies with each such body during its evaluation moving through first and second scenes, corresponding to differing first and second fields of view, in each of which changes occur in configuration of that body during such movement, said method comprising:

acquiring a first scene evaluation image representation of an image of said first scene at a selected time during movement of a body undergoing evaluation simultaneously through said first and second scenes, there being a body image portion corresponding to that body in said first scene image and a remainder image portion in said first scene image corresponding to those portions of said first scene image remaining after excluding said body image portion therefrom;

acquiring a second scene evaluation image representation of an image of said second scene substantially at said selected time during said movement of said body, there being a body image portion corresponding to that body in said second scene image and a remainder image portion in said second scene image corresponding to those portions of said second scene image remaining after excluding said body image portion therefrom;

constructing from said first scene evaluation image representation a first scene evaluation image segregation representation segregating therein portions thereof corresponding to at least part of said first scene image body image portion from portions thereof corresponding to said first scene image remainder image portion;

constructing from said second scene evaluation image representation a first scene evaluation image segregation representation segregating therein portions thereof corresponding to at least part of said second scene image body image portion from portions thereof corresponding to said second scene image remainder image portion; and ascertaining a value of at least one selected parameter from said first and second scene evaluation image segregation representations.

2. The apparatus of claim 1 wherein said first and second fields of view are directed substantially orthogonal to one another.

3. The method of claim 1 wherein said ascertaining a value of a selected parameter comprises determining a value for a parameter of a body undergoing evaluation selected from among that body's length, width and height.

4. The method of claim 1 wherein said acquiring of said first scene evaluation image representation at said selected time during movement of a body undergoing evaluation has said selected time selected by detecting said body undergoing evaluation having reached a selected location in said first and second scenes.

5. The method of claim 1 wherein said constructing of said first scene evaluation image segregation representation further comprises acquiring a first scene background image representation of an image of said first scene absent any body moving through said first scene, and wherein said constructing of said second scene evaluation image segregation representation further comprises acquiring a second scene background image representation of an image of said second scene absent any body moving through said second scene.

6. A changeable configuration body evaluation system for evaluating changeable configuration bodies with each such body during its evaluation moving through first and second scenes, corresponding to differing first and second fields of view, in each of which changes occur in configuration of that body during such movement, said system comprising:

an image acquisition means for acquiring a first scene evaluation image representation of an image of said first scene at a selected time during movement of a body undergoing evaluation simultaneously through said first and second scenes, there being a body image portion corresponding to that body in said first scene image and a remainder image portion in said first scene image corresponding to those portions of said first scene image remaining after excluding said body image portion therefrom, and further for acquiring a second scene evaluation image representation of an image of said second scene substantially at said selected time during said movement of said body, there being a body image portion corresponding to that body in said second scene image and a remainder image portion in said second scene image corresponding to those portions of said second scene image remaining after excluding said body image portion therefrom; and a storage and computing means for constructing from said first scene evaluation image representation a first scene evaluation image segregation representation segregating therein portions thereof corresponding to said first scene image body image portion and said first scene image remainder image portion, and for constructing from said second scene evaluation image representation a second scene evaluation image segregation representation segregating therein portions thereof corresponding to said second scene image body image portion and said second scene image remainder image portion, and further ascertaining a value of at least one selected parameter from said first and second scene evaluation image segregation representations.

7. A method for evaluating animals with each such animal during its evaluation moving through first and second scenes corresponding to differing first and second fields of view, said method comprising:

acquiring a first scene evaluation image representation of an image of said first scene at a selected time during movement of an animal undergoing evaluation simultaneously through said first and second scenes, there being an animal image portion corresponding to that animal in said first scene image and a remainder image portion in said first scene image corresponding to those portions of said first scene image remaining after excluding said animal image portion therefrom;

acquiring a second scene evaluation image representation of an image of said second scene substantially at said selected time during said movement of said animal, there being an animal image portion corresponding to that animal in said second scene image and a remainder image portion in said second scene image corresponding to those portions of said second scene image remaining after excluding said animal image portion therefrom; and locating in at least one of said first and second scene evaluation image representations a separation location between at least part of said animal image portion thereof and at least part of said remainder image portion thereof.

8. The method of claim 1 further comprising locating in each of said first and second scene evaluation image representations a separation location between at least part of said animal image portion thereof and at least part of said remainder image portion thereof.

9. The method of claim 1 wherein said acquiring of said first and second scene evaluation image representations at substantially said selected time is initiated by detecting said animal having reached a selected location in moving through said first and second scenes.

10. A method for evaluating animals with each such animal during its evaluation moving through a first scene in a chute corresponding to a first field of view, said chute comprising first and second spaced apart side walls with said first side wall supporting a background surface in said first field of view having a visual appearance contrasting with visual appearances of said animals, said method comprising:

permitting an animal to be evaluated to move through said chute past said first side wall;

sensing that said animal reaching a selected position in said first scene so as to be obscuring a portion of said background surface in said first field of view; and acquiring a first scene evaluation image representation of an image of said first scene in said first field of view at that time at which said animal is sensed to have reached said selected position during movement thereof through said first scene, there being an animal image portion corresponding to that animal in said first scene image and a remainder image portion in said first scene image corresponding to those portions of said first scene image remaining after excluding said animal image portion therefrom including a part thereof representing an uncovered portion of said background surface.

11. The method of claim 10 wherein said animal simultaneously moves through a second scene in said chute corresponding to a second field of view, and further comprises acquiring a second scene evaluation image representation of an image of said second scene in said first field of view at that time at which said animal is sensed to have reached said selected position during movement thereof through said first scene, there being an animal image portion corresponding to that animal in said second scene image and a remainder image portion in said second scene image corresponding to those portions of said second scene image remaining after excluding said animal image portion therefrom.

12. A method for evaluating animals with each such animal during its evaluation moving through first and second scenes corresponding to differing first and second fields of view, said method comprising:

acquiring a first scene evaluation image representation of an image of said first scene at a selected time during movement of an animal undergoing evaluation simultaneously through said first and second scenes, there being an animal image portion corresponding to that animal in said first scene image and a remainder image portion in said first scene image corresponding to those portions of said first scene image remaining after excluding said animal image portion therefrom;

acquiring a second scene evaluation image representation of an image of said second scene substantially at said selected time during said movement of said animal, there being an animal image portion corresponding to that animal in said second scene image and a remainder image portion in said second scene image corresponding to those portions of said second scene image remaining after excluding said animal image portion therefrom;

constructing from said first scene evaluation image representation a first scene evaluation image segregation representation segregating therein portions thereof corresponding to at least part of said first scene image animal image portion from portions thereof corresponding to said first scene image remainder image portion;

constructing from said second scene evaluation image representation a first scene evaluation image segregation representation segregating therein portions thereof corresponding to at least part of said second scene image animal image portion from portions thereof corresponding to said second scene image remainder image portion;

ascertaining values of a plurality of selected parameters from said first and second scene evaluation image segregation representations; and forming selected animal indicia for said animal undergoing evaluation based on selected combinations of said plurality of selected parameters.

13. The method of claim 12 wherein said method further comprises estimating a value for a selected animal trait based on said selected animal indicia.

14. The method of claim 12 wherein said forming of selected animal indicia comprises calculating selected ratios of said values of said selected parameters.

15. The method of claim 12 wherein said ascertaining values of a plurality of selected parameters comprises determining values for those parameters of an animal undergoing evaluation selected from among that animal's body length, shoulder width, rump width and rump height.

16. The method of claim 12 wherein said acquiring of said first scene evaluation image representation at said selected time during movement of an animal undergoing evaluation has said selected time selected by detecting said animal undergoing evaluation having reached a selected location in said first and second scenes.

17. The method of claim 12 wherein said constructing of said first scene evaluation image segregation representation further comprises acquiring a first scene background image representation of an image of said first scene absent any animal moving through said first scene, and wherein said constructing of said second scene evaluation image segregation representation further comprises acquiring a second scene background image representation of an image of said second scene absent any animal moving through said second scene.

18. The method of claim 12 wherein said acquiring of said first scene evaluation image representation at said selected time during movement of an animal undergoing evaluation is accomplished using a first video camera and a storage and computing means such that a binary representation is stored at least temporarily in said storage and computing means for each corresponding image pixel element in said first scene image sensed by a corresponding image sensing element in said first video camera, and wherein said acquiring of said second scene evaluation image representation at substantially said selected time during movement of an animal undergoing evaluation is accomplished using a second video camera and said storage and computing means such that a binary representation is stored at least temporarily in said storage and computing means for each corresponding image pixel element in said second scene image sensed by a corresponding image sensing element in said second video camera.

19. The method of claim 13 wherein said estimating of said value of said selected animal trait further comprises use of statistical parameters previously determined through performing said method for evaluating animals on other animals and also gauging values of said selected animal trait therefor.

20. The method of claim 15 wherein said forming selected animal indicia comprises calculating ratios selected from among a shoulder muscle-to-bone ratio determined by a ratio of said values of said shoulder width and rump height, a rump muscle-to-bone ratio determined by a ratio of said values of rump width and rump height, a musculoskeletal development per unit length ratio determined by a ratio of a value of a sum of said shoulder muscle-to-bone and rump muscle-to-bone ratios and said body length value, and a musculoskeletal development per unit height ratio determined by a ratio of a value of a sum of said shoulder muscle-to-bone and rump muscle-to-bone ratios and said rump height value.

21. The method of claim 17 wherein said constructing of said first scene evaluation image segregation representation further comprises comparing corresponding parts of said first scene evaluation image representation and said first scene background image representation and forming said first scene evaluation image segregation representation by assigning a first reference value to parts thereof if differences between corresponding parts of said first scene evaluation image representation and said first scene background image representation exceed corresponding selected values and a second reference value if such differences fail to exceed corresponding selected values, and wherein said constructing of said second scene evaluation image segregation representation further comprises comparing corresponding parts of said second scene evaluation image representation and said second scene background image representation and forming said second scene evaluation image segregation representation by assigning a third reference value to parts thereof if differences between corresponding parts of said second scene evaluation image representation and said second scene background image representation exceed corresponding selected values and a fourth reference value if such differences fail to exceed corresponding selected values.

22. The method of claim 19 wherein said ascertaining values of a plurality of selected parameters comprises determining values for those parameters of an animal undergoing evaluation selected from among that animal's body length, shoulder width, rump width and rump height.

23. The method of claim 19 wherein separate sets of statistical parameters are used for each animal gender.

24. The method of claim 22 wherein said forming selected animal indicia comprises calculating ratios selected from among a shoulder muscle-to-bone ratio determined by a ratio of said values of said shoulder width and rump height, a rump muscle-to-bone ratio determined by a ratio of said values of rump width and rump height, a musculoskeletal development per unit length ratio determined by a ratio of a value of a sum of said shoulder muscle-to-bone and rump muscle-to-bone ratios and said body length value, and a musculoskeletal development per unit height ratio determined by a ratio of a value of a sum of said shoulder muscle-to-bone and rump muscle-to-bone ratios and said rump height value.

25. The method of claim 24 wherein said selected animal trait is selected from among quality of carcass meat, quantity of carcass meat, relative leanness of animal carcass, fertility and feed conversion efficiency.

26. An animal evaluation system for evaluating animals with each such animal during its evaluation moving through first and second scenes corresponding to differing first and second fields of view, said system comprising:

an image acquisition means for acquiring a first scene evaluation image representation of an image of said first scene at a selected time during movement of an animal undergoing evaluation simultaneously through said first and second scenes, there being an animal image portion corresponding to that animal in said first scene image and a remainder image portion in said first scene image corresponding to those portions of said first scene image remaining after excluding said animal image portion therefrom, and further for acquiring a second scene evaluation image representation of an image of said second scene substantially at said selected time during said movement of said animal, there being an animal image portion corresponding to that animal in said second scene image and a remainder image portion in said second scene image corresponding to those portions of said second scene image remaining after excluding said animal image portion therefrom; and a storage and computing means for constructing from said first scene evaluation image representation a first scene evaluation image segregation representation segregating therein portions thereof corresponding to said first scene image animal image portion and said first scene image remainder image portion, and for constructing from said second scene evaluation image representation a second scene evaluation image segregation representation segregating therein portions thereof corresponding to said second scene image animal image portion and said second scene image remainder image portion, and further for ascertaining values of a plurality of selected parameters from said first and second scene evaluation image segregation representations and forming animal indicia for said animal undergoing evaluation based on said plurality of selected parameters.

27. The apparatus of claim 26 wherein an animal undergoing evaluation moving through said first and second scenes passes through a chute, said chute having an open top through which one of said fields of view is obtained, and further having a side wall with an opening therein through which that remaining one of said fields of view is obtained but only of a selected portion of said animal undergoing evaluation at said selected time.

28. The apparatus of claim 26 wherein said acquiring of said first scene evaluation image representation at said selected time during movement of an animal undergoing evaluation has said selected time selected by a detection means for detecting said animal undergoing evaluation having reached a selected location in said first and second scenes.

29. The apparatus of claim 26 wherein said image acquisition means comprises a first video camera such that a binary representation is stored at least temporarily in said storage and computing means for each corresponding image pixel element in said first scene image sensed by a corresponding image sensing element in said first video camera, and further comprises a second video camera such that a binary representation is stored at least temporarily in said storage and computing means for each corresponding image pixel element in said second scene image sensed by a corresponding image sensing element in said second video camera.

30. The apparatus of claim 29 wherein an animal undergoing evaluation moving through said first and second scenes passes through a chute means, said chute means having an open top through which one of said fields of view is obtained by said first video camera, and further having a side wall with an opening therein through which that remaining one of said fields of view is obtained by said second video camera but only of a selected portion of said animal undergoing evaluation at said selected time.

31. The apparatus of claim 30 wherein said acquiring of said first scene image representation at said selected time during movement of an animal undergoing evaluation has said selected time selected by a detection means positioned over said open top of said chute means and capable of detecting an animal undergoing evaluation having reached a selected location in said first and second scenes.

\* \* \* \* \*

UNITED STATES PATENT AND TRADEMARK OFFICE
CERTIFICATE OF CORRECTION

PATENT NO. : 5,483,441
DATED : January 9, 1996
INVENTOR(S) : WAYNE W. SCOFIELD

It is certified that error appears in the above-indentified patent and that said Letters Patent is hereby corrected as shown below:

Col. 4, line 31, delete "10" after "on"

Col. 9, line 26, change "]31" to --131--

Col. 15, line 30, insert --9--, after "or"

Col. 19, line 33, delete "1189", insert --189--

Col. 19, line 58, insert --.-- after "animal"

Col. 20, Equation 11, delete "SHW", (first occurence) insert --SMB--

Signed and Sealed this

Ninth Day of April, 1996

BRUCE LEHMAN

*Attest:*

*Attesting Officer*  Commissioner of Patents and Trademarks

UNITED STATES PATENT AND TRADEMARK OFFICE
CERTIFICATE OF CORRECTION

PATENT NO. : 5,483,441

DATED : January 9, 1996

INVENTOR(S) : WAYNE W. SCOFIELD

It is certified that error appears in the above-indentified patent and that said Letters Patent is hereby corrected as shown below:

Col. 26, line 2, delete "first", insert --second--

Col. 28, line 42, delete "first", insert --second--

Signed and Sealed this

Eighteenth Day of June, 1996

*Attest:*

BRUCE LEHMAN

*Attesting Officer*      *Commissioner of Patents and Trademarks*